United States Patent
Yoshida et al.

(10) Patent No.: US 11,206,337 B2
(45) Date of Patent: Dec. 21, 2021

(54) IMAGE OUTPUT APPARATUS, RECORDING MEDIUM HAVING CONTROL PROGRAM FOR IMAGE OUTPUT APPARATUS, AND METHOD FOR CONTROLLING IMAGE OUTPUT APPARATUS

(71) Applicant: SHARP KABUSHIKI KAISHA, Sakai (JP)

(72) Inventors: Mayuko Yoshida, Sakai (JP); Takashi Sawano, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/119,761

(22) Filed: Dec. 11, 2020

(65) Prior Publication Data
US 2021/0195043 A1    Jun. 24, 2021

(30) Foreign Application Priority Data
Dec. 20, 2019   (JP) .............................. JP2019-230516

(51) Int. Cl.
*H04N 1/00* (2006.01)

(52) U.S. Cl.
CPC ....... *H04N 1/00708* (2013.01); *H04N 1/0044* (2013.01); *H04N 1/00761* (2013.01); *H04N 1/00771* (2013.01)

(58) Field of Classification Search
CPC ............. H04N 1/00708; H04N 1/0071; H04N 1/00713; H04N 1/0044; H04N 1/00761; H04N 1/00771
See application file for complete search history.

(56) References Cited

U.S. PATENT DOCUMENTS

| | | | |
|---|---|---|---|
| 6,578,019 B1 * | 6/2003 | Suda ........................ | G06N 5/02 706/15 |
| 2007/0024923 A1 * | 2/2007 | Shimizu ............. | H04N 1/00758 358/471 |
| 2007/0025752 A1 * | 2/2007 | Maeda ............... | G03G 15/5095 399/81 |

FOREIGN PATENT DOCUMENTS

JP          2015-064414 A      4/2015

* cited by examiner

*Primary Examiner* — Moustapha Diaby
(74) *Attorney, Agent, or Firm* — ScienBiziP, P.C.

(57) ABSTRACT

In a multifunction peripheral according to the present invention, a sheet selection screen for selecting a sheet that is the output destination is presented. A "check sheet size" button is provided on the sheet selection screen. When the "check sheet size" button is operated, an optimal sheet size identification function is started, and a document size identification process including pre-scan is performed. Accordingly, the size of a document is identified. Further, an optimal sheet size identification process is performed. Thus, the optimal sheet size, which is a suitable sheet size corresponding to the size of the document, is identified.

17 Claims, 17 Drawing Sheets

IMAGE OUTPUT APPARATUS, RECORDING MEDIUM HAVING CONTROL PROGRAM FOR IMAGE OUTPUT APPARATUS, AND METHOD FOR CONTROLLING IMAGE OUTPUT APPARATUS

BACKGROUND OF THE INVENTION

Field of the Invention

The present invention relates to an image output apparatus, a recording medium having a control program for the image output apparatus, and a method for controlling the image output apparatus, and more particularly to an image output apparatus having a function to automatically identify the size of a sheet, which is the output destination of an image of a document, in accordance with the size of the document, a recording medium for the image output apparatus, and a method for controlling the image output apparatus.

Description of the Background Art

Japanese Laid-open Patent Publication No. 2015-64414 discloses an example of the above type of technology. According to the technology disclosed in Japanese Laid-open Patent Publication No. 2015-64414, an image forming apparatus, which is an image output apparatus, includes a size inputter that inputs the size of a document, and an identifier that identifies the size of the sheet, which is the output destination of the image of the document, in accordance with the size of the document input by the size inputter. When the size of the document input by the size inputter is an irregular size, the identifier identifies, as the size of a sheet, a regular size that is the smallest one of the sizes larger than the size of the document. The image of the document is printed on the sheet of the regular size identified by the identifier, that is, the image is output.

According to the technology disclosed in Japanese Laid-open Patent Publication No. 2015-64414 described above, however, there is a problem in that the user needs to input the size of the document by using the size inputter and the input task is complicated for the user. In some cases, the user does not know the size of a document (and does not have a way to measure the size of a document) and, in such a case, is not able to properly deal with the situation with the technology disclosed in Japanese Laid-open Patent Publication No. 2015-64414.

The present invention has an object to provide a novel technology that eliminates the need for complicated tasks, such as inputting the size of a document, and makes it possible to automatically identify the suitable size of the sheet corresponding to the size of the document even when the user does not know the size of the document.

SUMMARY OF THE INVENTION

In order to achieve the above-described object, the present invention includes a first invention regarding an image output apparatus, a second invention regarding a recording medium for the image output apparatus, and a third invention regarding a method for controlling the image output apparatus.

The first invention regarding the image output apparatus includes a first operation receiver, an image reader, a document size identifier, and a suitable size identifier. The first operation receiver receives, from a user, a first operation for giving an instruction to identify, as a size of a sheet that is an output destination of an image of a document, a suitable size corresponding to a size of the document. The image reader reads the image of the document in response to the first operation received by the first operation receiver. The document size identifier identifies the size of the document based on an image read by the image reader. The suitable size identifier identifies the suitable size from multiple specified sizes based on the size of the document identified by the document size identifier.

When the document size (is assumed to) match any of specified sizes (what is called regular sizes) such as A4 size and B5 size, the suitable size described here is the specified size that matches the document size. On the other hand, when the document size does not match any of the specified sizes, that is, when the document size is an unspecified size (what is called irregular size), the suitable size is the smallest one of the specified sizes larger than the document size.

According to the first invention, a display and a first display controller may be further included. The display includes a display surface. The first display controller causes the display surface of the display to present a first screen. The first screen includes an operator serving as the first operation receiver.

According to the first invention, a second display controller may be further included. The second display controller causes the display surface of the display to present a second screen. The second screen includes suitable size information about the suitable size identified by the suitable size identifier.

According to the first invention, a first setter may be further included. The first setter sets the suitable size identified by the suitable size identifier as the size of the sheet that is the output destination of the image of the document.

The size of the sheet set by the first setter may be changed. Therefore, for example, a second operation receiver and a first size changer may be further included. The second operation receiver receives, from the user, a second operation for giving an instruction to change the size of the sheet set by the first setter. The first size changer changes the size of the sheet set by the first setter in response to the second operation received by the second operation receiver.

According to the first invention, when a display is included, a third display controller may be further included. The third display controller causes the display surface of the display to present a third screen. The third screen includes multiple preview images that are expected when the image of the document is output to the respective sheets of the specified sizes at a predetermined magnification.

The predetermined magnification described here may be a magnification common to the specified sizes, for example, one-fold (100%).

The predetermined magnification described here may be a magnification corresponding to each of the specified sizes and, for example, such a magnification that the image of the document fits maximally to the sheet of each of the specified sizes.

The predetermined magnification described here may be changed. Therefore, for example, a third operation receiver and a magnification changer may be included. The third operation receiver receives, from the user, a third operation for giving an instruction to change the predetermined magnification. The magnification changer changes the predetermined magnification in response to the third operation received by the third operation receiver.

It is preferable that, among the preview images, the preview image corresponding to the suitable size is displayed in such a manner that the preview image is distinguishable from the other preview images.

The third screen including each of the preview images may include accompanying information corresponding to each of the preview images.

For example, it is assumed that a fee required to output the image of the document to the respective sheets of the specified sizes is previously determined. In this case, the accompanying information may include fee information about the fee corresponding to each of the preview images.

The accompanying information may include magnification information about the above-described predetermined magnification corresponding to each of the preview images.

In a case where the above-described third screen is presented, a fourth operation receiver and a second setter may be included. The fourth operation receiver receives, from the user, a fourth operation for giving an instruction to set any of the specified sizes corresponding to the preview images as the size of the sheet that is the output destination of the image of the document. The second setter sets the specified size corresponding to the fourth operation as the size of the sheet that is the output destination of the image of the document in response to the fourth operation received by the fourth operation receiver.

The size of the sheet set by the second setter may be changed. Therefore, for example, a fifth operation receiver and a second size changer may be further included. The fifth operation receiver receives, from the user, a fifth operation for giving an instruction to change the size of the sheet set by the second setter. The second size changer changes the size of the sheet set by the second setter in response to the fifth operation received by the fifth operation receiver.

According to the first invention, an image former may be further included. The image former forms the image of the document on the sheet that is the output destination of the image of the document. That is, the image output apparatus according to the first invention may be an image forming apparatus including the image former.

A computer-readable recording medium having stored therein a control program for an image output apparatus according to a second invention included in the present invention causes a computer of the image output apparatus to execute reading, first identifying, and second identifying. The image output apparatus includes a first operation receiver. The first operation receiver receives, from a user, a first operation for giving an instruction to identify, as a size of a sheet that is an output destination of an image of a document, a suitable size corresponding to a size of the document. At the reading, the image of the document is read in response to the first operation received by the first operation receiver. At the first identifying, the size of the document is identified based on an image read at the reading. At the second identifying, the suitable size is identified from multiple specified sizes based on the size of the document identified at the first identifying.

A method for controlling an image output apparatus according to a third invention included in the present invention includes reading an image, first identifying, and second identifying. The image output apparatus includes a first operation receiver. The first operation receiver receives, from a user, a first operation for giving an instruction to identify, as a size of a sheet that is an output destination of an image of a document, a suitable size corresponding to a size of the document. At the reading, the image of the document is read in response to the first operation received by the first operation receiver. At the first identifying, the size of the document is identified based on an image read at the reading. At the second identifying, the suitable size is identified from multiple specified sizes based on the size of the document identified at the first identifying.

According to the present invention, contrary to the technology disclosed in Japanese Laid-open Patent Publication No. 2015-64414 described above, it is possible to eliminate the need for complicated tasks such as inputting the size of a document, and even when a user does not know the size of a document, automatically identify the suitable sheet size corresponding to the size of the document. This is extremely useful for a user, especially a user who is unfamiliar with the handling of the image output apparatus.

DESCRIPTION OF THE PREFERRED EMBODIMENTS

First Embodiment

Figure 1:
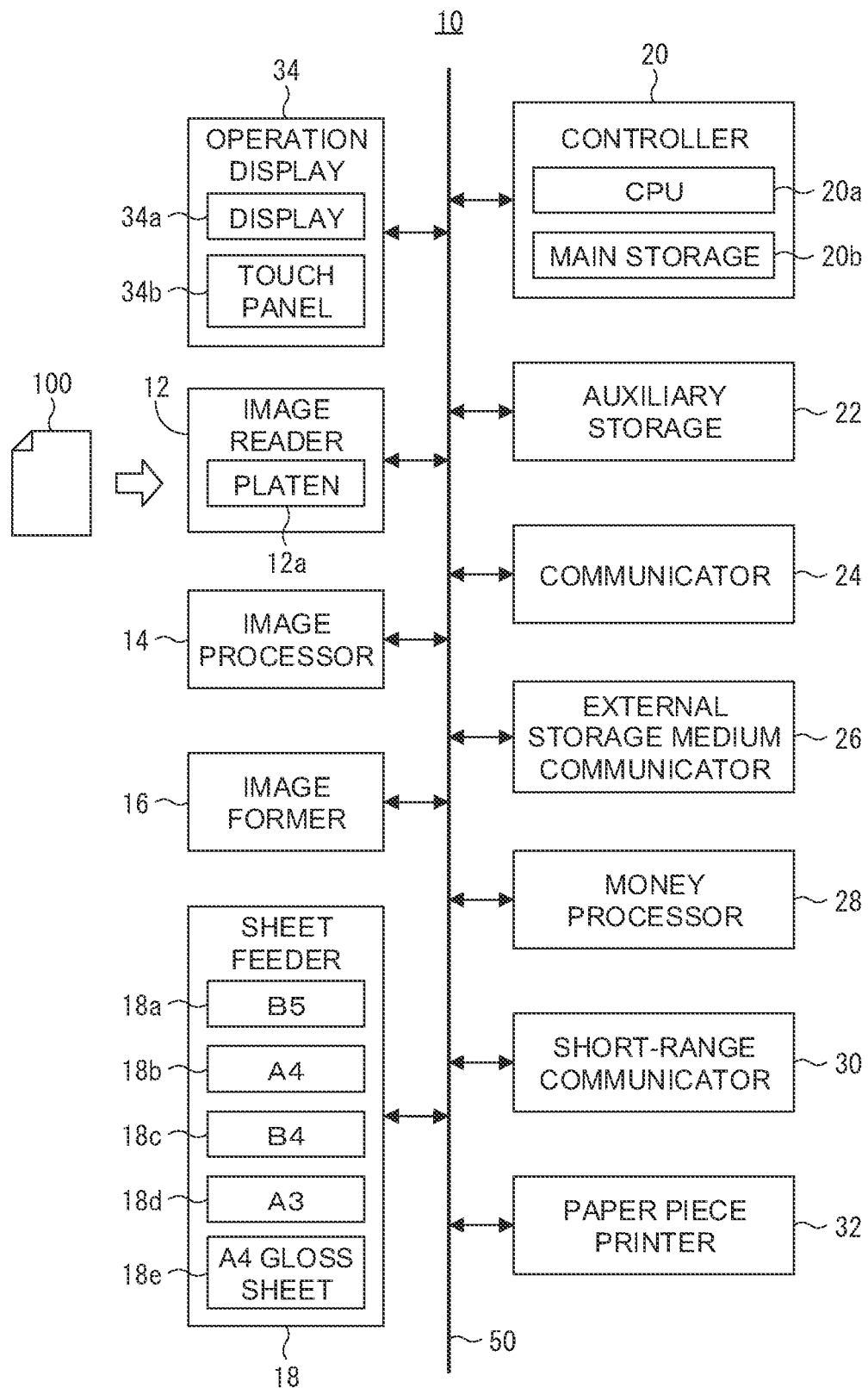
FIG. 1 is a block diagram illustrating an electrical configuration of a multifunction peripheral according to a first embodiment of the present invention.

A first embodiment of the present invention is described by using a multifunction peripheral (MFP) 10 illustrated in FIG. 1 as an example.

The multifunction peripheral 10 according to the first embodiment is installed in a convenience store, a supermarket, etc. on the assumption that, for example, the multifunction peripheral 10 is used by an unspecified number of people. The multifunction peripheral 10 has multiple functions such as a copier function, a printer function, an image scanner function, and a fax function. The multifunction peripheral 10 uses these functions to provide various services such as a copy service, a print service, a scan service, and a fax service.

The multifunction peripheral 10 includes an image reader 12, an image processor 14, an image former 16, and a sheet feeder 18. The multifunction peripheral 10 further includes a controller 20, an auxiliary storage 22, and a communicator 24. The multifunction peripheral 10 further includes an external storage medium communicator 26, a money processor 28, a short-range communicator 30, and a paper piece printer 32. The multifunction peripheral 10 further includes an operation display 34. The image reader 12, the image processor 14, the image former 16, the sheet feeder 18, the controller 20, the auxiliary storage 22, the communicator 24, the external storage medium communicator 26, the money processor 28, the short-range communicator 30, the paper piece printer 32, and the operation display 34 are coupled to one another via a common bus 50.

The image reader 12 is an example of an image reader. Specifically, the image reader 12 includes a platen 12*a* on which a document 100 is placed (set). The image reader 12 performs an image reading process to read the image of the document 100 placed on the platen 12*a* and output the two-dimensional image data corresponding to the read image. Therefore, the platen 12*a* is made of, for example, a transparent rectangular flat plate member such as glass. Although not illustrated, an image read unit including a light source, a mirror, an imaging range, a line sensor, and the like, and a drive mechanism that moves the image reading position of the image read unit are provided under the platen 12*a*. A document pressing cover (not illustrated) that presses the document 100 placed on the platen 12*a* is provided above the platen 12*a*.

The image processor 14 is an example of an image processor. Specifically, the image processor 14 executes appropriate image processing on various types of image data such as image data output from the image reader 12. Therefore, the image processor 14 includes an image processing executor such as a digital signal processor (DSP) (not illustrated). The image processing executed by the image processor 14 includes edge detection processing described below.

The image former 16 is an example of an image former. Specifically, the image former 16 performs an image forming process to form an image, i.e., execute printing, based on appropriate image data such as data having undergone image processing by the image processor 14 on a sheet (not illustrated) that is an image recording medium. The image forming process is performed by using, for example, a known electrophotographic system. The image former 16 includes a photoconductor drum, a charging device, an exposure device, a developing device, a transfer device, a fixing device, and the like, which are not illustrated. An image recording medium, i.e., a printed material, having the image formed thereon during the image forming process by the image former 16 is discharged to a sheet discharge tray (not illustrated). The image former 16 may perform an image forming process by using another system such as an inkjet system instead of an electrophotographic system.

The sheet feeder 18 is an example of a sheet feeder. Specifically, the sheet feeder 18 includes one or more, for example, five sheet feed cassettes 18*a*, 18*b*, 18*c*, 18*d*, and 18*e*. The sheet feed cassettes 18*a*, 18*b*, 18*c*, 18*d*, and 18*e* contain sheets having an appropriately specified size. For example, the sheet feed cassette 18*a* on the top illustrated in FIG. 1 contains sheets of a B5 size (182 mm×257 mm), strictly speaking, regular sheets. The sheet feed cassette 18*b*, which is the second from the top as illustrated in FIG. 1, contains regular sheets of A4 size (210 mm×297 mm), the sheet feed cassette 18*c*, which is the third from the top, contains regular sheets of B4 size (364 mm×257 mm), and the sheet feed cassette 18*d*, which is the fourth from the top, contains regular sheets of A3 size (420 mm×297 mm). The sheet feed cassette 18*e* on the bottom illustrated in FIG. 1 contains gloss sheets of A4 size (210 mm×297 mm). The sheet feeder 18 feeds sheets one by one to the image former 16 from the feed source that is any one of the sheet feed cassettes 18*a*, 18*b*, 18*c*, 18*d*, and 18*e*.

The controller 20 is an example of a controller that performs the overall control on the multifunction peripheral 10. Therefore, the controller 20 includes a computer that is a control executer, for example, a central processing unit (CPU) 20*a*. The controller 20 further includes a main storage 20*b* that is a main storage accessible directly by the CPU 20*a*. The main storage 20*b* includes, for example, a read only memory (ROM) and a random access memory (RAM) (not illustrated). The ROM stores a control program (firmware) for controlling the operation of the CPU 20*a*. The RAM forms a work area and a buffer area used when the CPU 20*a* executes processing based on the control program.

The auxiliary storage 22 is an example of an auxiliary storage. Specifically, the auxiliary storage 22 appropriately stores various types of data such as data having undergone image processing by the image processor 14 described above. The auxiliary storage 22 includes, for example, a hard disk drive (not illustrated). The auxiliary storage 22 may include a non-volatile rewritable memory such as a flash memory.

The communicator 24 is an example of a communicator. Specifically, the communicator 24 is connected to a communication network (not illustrated) to perform two-way communications via the communication network. The communication network described here includes a local area network (LAN), the Internet, a public switched telephone network, etc. The LAN includes a wireless LAN (a wireless LAN according to the IEEE 802.11 standard, what is called Wi-Fi (registered trademark)).

The external storage medium communicator 26 is an example of an external storage medium communicator. Specifically, the external storage medium communicator 26 includes an external storage medium attachment (not illustrated) to which various types of media are attachable as an external storage medium (not illustrated) so as to perform two-way communications with the medium attached to the external storage medium attachment. The media described here include semiconductor media such as a secure digital (SD) memory card or a Universal Serial Bus (USB) memory and disk media such as a compact disc (CD) or a digital versatile disk (DVD). The external storage medium communicator 26 includes an infrared communicator that performs two-way communications by using an infrared communication function with a mobile device, such as a smartphone or a tablet, having the infrared communication function. That is, a mobile device having an infrared communication function may be treated as an external storage medium.

The money processor 28 is an example of a money settlement processor that performs money settlement processing to settle the usage fee (price) of the multifunction peripheral 10 with money. Therefore, the money processor 28 includes a money input receiver (not illustrated) that receives the input money (coin and note) and a change returner (not illustrated) that returns the change when there is the change.

The short-range communicator 30 is an example of a short-range communicator that performs two-way communications with a non-contact integrated circuit (IC) card (not illustrated). Therefore, the short-range communicator 30 includes an IC card reader (not illustrated). When an IC card is placed (set) on the IC card reader, the short-range communicator 30 performs a short-range wireless communication in accordance with a short-range wireless communication standard such as ISO/IEC 18092 (what is called Near Field Communication (NFC)) with the IC card. The IC card described here includes, for example, an electronic money card. Specifically, the multifunction peripheral 10 allows the settlement of the usage fee using predetermined electronic money and, to do so, the electronic money card for the electronic money is placed on the IC card reader. The IC card described here also includes the basic resident register card and the personal number card. Specifically, the multifunction peripheral 10 may also provide administrative services to issue a predetermined official certificate such as a copy of a residence certificate or a seal registration certificate and, to do so, the basic resident register card or the personal number card of a person who intends to receive the administrative service is placed on the IC card reader.

The paper piece printer 32 is an example of a paper piece issuer that issues a piece of paper such as a receipt and is, for example, a thermal (heat-sensitive) printer or a dot impact printer. The paper piece printer 32 prints an appropriate text, image, or the like, on a roll paper (not illustrated) and discharge the printed material, the piece of paper, from a discharger (not illustrated) so as to issue the piece of paper.

The operation display 34 is what is called a control panel and includes a display 34*a*, which is an example of a display, and a touch panel 34*b*, which is an example of an operation receiver. The display 34*a* has a display surface having substantially a rectangular shape, and the touch panel 34*b* is provided so as to be overlapped with the display surface of the display 34*a*. The display 34*a* is, but not limited thereto, a liquid crystal display (LCD), for example, and may be a display having a different system, such as an organic electro luminescence (EL) display. The touch panel 34*b* is, but not limited thereto, a capacitive panel, for example, and may be a panel having a different system, such as an inductive, resistive, or infrared system. The operation display 34 includes an appropriate light emitter such as a light emitting diode (LED) (not illustrated) in addition to the display 34*a*. The operation display 34 further includes an appropriate hardware switch such as a push button switch (not illustrated) in addition to the touch panel 34*b*.

The multifunction peripheral 10 according to the first embodiment has an optimal sheet size identification function as one of the auxiliary functions for improving the usability for the user who uses the multifunction peripheral 10. With the optimal sheet size identification function, for example, the copy function automatically identifies the size of the sheet, which is the output destination (print destination) of the image on the document 100, in accordance with the size of the document 100, in particular, identifies the optimal sheet size that is expected to be the most suitable size for the sheet.

Specifically, when the size of the document 100 matches for example any of the sizes of the sheets prepared in the multifunction peripheral 10 (i.e., contained in the sheet feed cassettes 18*a*, 18*b*, 18*c*, 18*d*, and 18*e* of the sheet feeder 18), the sheet size that matches the size of the document 100 is identified as the optimal sheet size. Conversely, when the size of the document 100 does not match any of the sizes of the sheets prepared in the multifunction peripheral 10, the smallest one of the sizes larger than the size of the document 100 among the sizes of the sheets prepared in the multifunction peripheral 10 is identified as the optimal sheet size.

After the optimal sheet size is thus identified, the optimal sheet size is set as the size of a sheet that is the output destination, that is, the output destination sheet is set. The setting details may be optionally changed. As described below, to identify the optimal sheet size, the document 100 is placed on the platen 12*a*, and then the image reader 12 executes a preliminary image reading process, specifically, executes an image reading process with a relatively low resolution on, as the read target, the entire effective read area on the platen 12*a*. With what is called pre-scan, the outline portion of the document 100 is specified, and thus the size of the document 100 is identified. Then, the optimal sheet size corresponding to the size of the document 100 is identified in the procedure described above. For example, when the document 100 spreads over the platen 12*a*, or when the size of the document 100 is larger than the size of the platen 12*a* (effective read area) in an extreme case, the outline portion of the document 100 is not specified, and thus the size of the document 100 is not identified. When the color of the document 100 is almost the same as the color of the pressing surface of the above-described document pressing cover or when the document 100 is transparent in an extreme case, the outline portion of the document 100 is not sometimes specified. In such a case, the display 34*a* presents a document detection error screen 500, described below, indicating that the document 100 is not detectable.

More specifically, it is assumed that, for example, the multifunction peripheral 10 has not been operated for a certain period of time and is currently waiting for any operation performed by the user, i.e., in what is called a standby state. While in a standby state, the display 34*a* of the multifunction peripheral 10 presents a home screen (also referred to as "menu screen" or "portal screen") (not illustrated) that is the basic operation screen of the multifunction peripheral 10. When the operation for selecting the copy function is performed on the home screen, the multifunction peripheral 10 enters a copy mode in response to the operation. Then, the display 34*a* presents, instead of the home screen, a color type selection screen (not illustrated) for selecting a color type, i.e., for making a selection as to whether a black-and-white copy or a color copy is to be performed. When the operation for selecting any color type is performed on the color type selection screen, the display 34*a* presents, instead of the color type selection screen, a sheet selection screen 200 illustrated in FIG. 2.

The sheet selection screen 200 is the operation screen for selecting the sheet that is the output destination. An appropriate text 202 having the content prompting the user to select the sheet that is the output destination is provided on, for example, the upper portion of the sheet selection screen 200. An appropriate diagram, what is called a schematic diagram (illustration) 204 schematically illustrating each sheet prepared in the multifunction peripheral 10 is provided under the text 202, especially at the position on the left side. A "check sheet size" button 206 that may receive the user's operation is provided under the schematic diagram 204. The "check sheet size" button 206 is an operator for giving an instruction to start the above-described optimal sheet size identification function, i.e., for giving an instruction to identify the optimal sheet size using the optimal sheet size identification function. An appropriate text 208 indicating a simple description for the "check sheet size" button 206, in other words, the optimal sheet size identification function, is provided under the "check sheet size" button 206.

Five sheet selection buttons 210, 212, 214, 216, and 218 for manually selecting the sheet that is the output destination are appropriately provided at the position on the right side under the text 202. The five sheet selection buttons 210, 212, 214, 216, and 218 correspond to the respective sheets prepared in the multifunction peripheral 10. The four sheet selection buttons 210, 212, 214, and 216 corresponding to regular sheets of four sizes, e.g., B5 size, A4 size, B4 size, and A3 size, are arranged in tandem in this order from top to bottom. Each of the four sheet selection buttons 210, 212, 214, and 216 is provided with the appropriate text indicating the corresponding size of a regular sheet and the appropriate text indicating the copy fee (unit price) per page in a case where the regular sheet of the corresponding size is the output destination. A sheet selection button 218 corresponding to an A4-size gloss sheet is provided on the right side of the sheet selection button 212 corresponding to an A4-size regular sheet, i.e., alongside of the sheet selection button 212. The sheet selection button 218 is provided with the appropriate text indicating that the sheet selection button 218 corresponds to an A4-size gloss sheet and the appropriate text indicating the copy fee per page in a case where the A4-size gloss sheet is the output destination. On the left side of the area where the sheet selection buttons 210, 212, 214, 216, and 218 are provided, an appropriate mark 220 is provided to indicate the size relationship of the sizes of sheets corresponding to the sheet selection buttons 210, 212, 214, 216, and 218. As an A4-size regular sheet and an A4-size gloss sheet have the same size, the two corresponding sheet selection buttons 212 and 218 are arranged side by side as described above.

Figure 2:
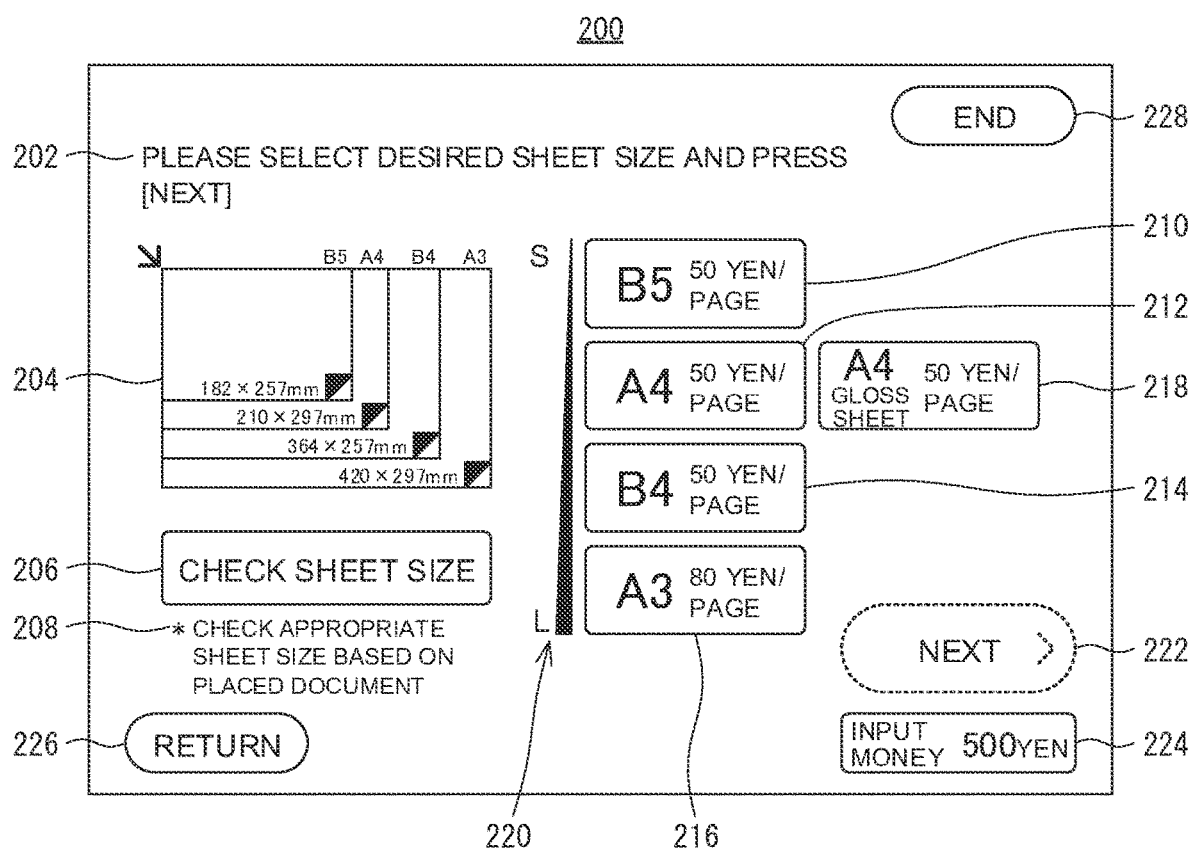
FIG. 2 is a diagram illustrating an example of a sheet selection screen according to the first embodiment.

A "next" button 222 is provided near the area where the sheet selection buttons 210, 212, 214, 216, and 218 are provided, for example, on the right side slightly under the sheet selection button 216 corresponding to an A3-size sheet. The "next" button 222 is an operator for setting (confirming), as the output destination, the sheet selected as the output destination on the sheet selection screen 200. Specifically, when the above-described "check sheet size" button 206 is operated (pressed) or when any one of the sheet selection buttons 210, 212, 214, 216, and 218 is operated, the sheet that is the output destination is selected as described below and then the "next" button 222 is operated so that the sheet selected as the output destination is set as the output destination. After the output destination sheet is thus set, the display 34a presents, instead of the sheet selection screen 200, a document reading operation screen (not illustrated) that is the screen subsequent to the sheet selection screen 200. Subsequently, the remaining operations necessary for copying, including an operation on the document reading operation screen, are performed as appropriate, and thus the copying is performed. When the "check sheet size" button 206 is not operated or when none of the sheet selection buttons 210, 212, 214, 216, and 218 are operated on the sheet selection screen 200 illustrated in FIG. 2, that is, when the output destination sheet has not been selected, the "next" button 222 is in a state not to receive an operation, for example, in a grayout state. In FIG. 2, the "next" button 222 is indicated in a broken line, which indicates that the "next" button 222 is in a grayout state.

An input-money display area 224 is provided under the "next" button 222, in other words, near the lower right corner of the sheet selection screen 200. The input-money display area 224 displays the input money at the present time in accordance with the receiving status of the input money by the above-described money processor 28 at the present time. FIG. 2 illustrates an example where the input money is "500 yen" at the present time. When the receiving status of the input money by the money processor 28 is changed, that is, when the input money is newly received or when all the received money is returned, the input money displayed on the input-money display area 224 is accordingly changed.

A "return" button 226 is provided near the lower left corner of the sheet selection screen 200. The "return" button 226 is an operator for returning to the state before the sheet selection screen 200 is displayed. Specifically, when the "return" button 226 is operated, the display 34a presents, instead of the sheet selection screen 200, the above-described color type selection screen that is the screen immediately before the sheet selection screen 200.

An "end" button 228 is provided near the upper right corner of the sheet selection screen 200. The "end" button 228 is an operator for (forcibly) ending the use of the copy function in the middle and returning the multifunction peripheral 10 to the above-described standby state. Specifically, when the "end" button 228 is operated, the multifunction peripheral 10 ends the copy mode and returns to the above-described standby state. Strictly speaking, when the "end" button 228 is operated, the display 34a presents an end confirmation screen (not illustrated) instead of the sheet selection screen 200. The end confirmation screen includes an appropriate text having the content questioning as to whether the copy function is to end and two buttons, a "Yes" button and a "No" button, to receive the user's operation as an answer to the question. When, for example, the "Yes" button is operated on the end confirmation screen, the display 34a presents the above-described home screen instead of the end confirmation screen. Accordingly, the multifunction peripheral 10 ends the copy mode and returns to the standby state. Conversely, when the "No" button is operated on the end confirmation screen, the display 34a presents the sheet selection screen 200 again instead of the end confirmation screen.

When, for example, the "check sheet size" button 206 is operated on the sheet selection screen 200, the optimal sheet size identification function is started, that is, the optimal sheet size identification using the optimal sheet size identification function is started. First, the display 34a presents a pre-scan guidance screen 300 illustrated in FIG. 3 instead of the sheet selection screen 200.

The pre-scan guidance screen 300 is a screen that provides guidance for the operation procedure for executing the above-described pre-scan when the optimal sheet size is identified by using the optimal sheet size identification function. An appropriate text 302 presenting a brief description of the operation procedure for executing the pre-scan is provided on, for example, the upper portion of the pre-scan guidance screen 300. A rectangular video display area 304 is provided under the text 302, strictly speaking, at the position slightly on the left side. On the video display area 304, an appropriate video (not illustrated) is displayed to provide the guidance for the procedure to place the document 100 on the platen 12a, which is the premise of pre-scan. A "check document size" button 306 is provided near the video display area 304, for example, slightly under the right side of the video display area 304. The "check document size" button 306 is an operator for giving an instruction to start pre-scan.

Figure 3:
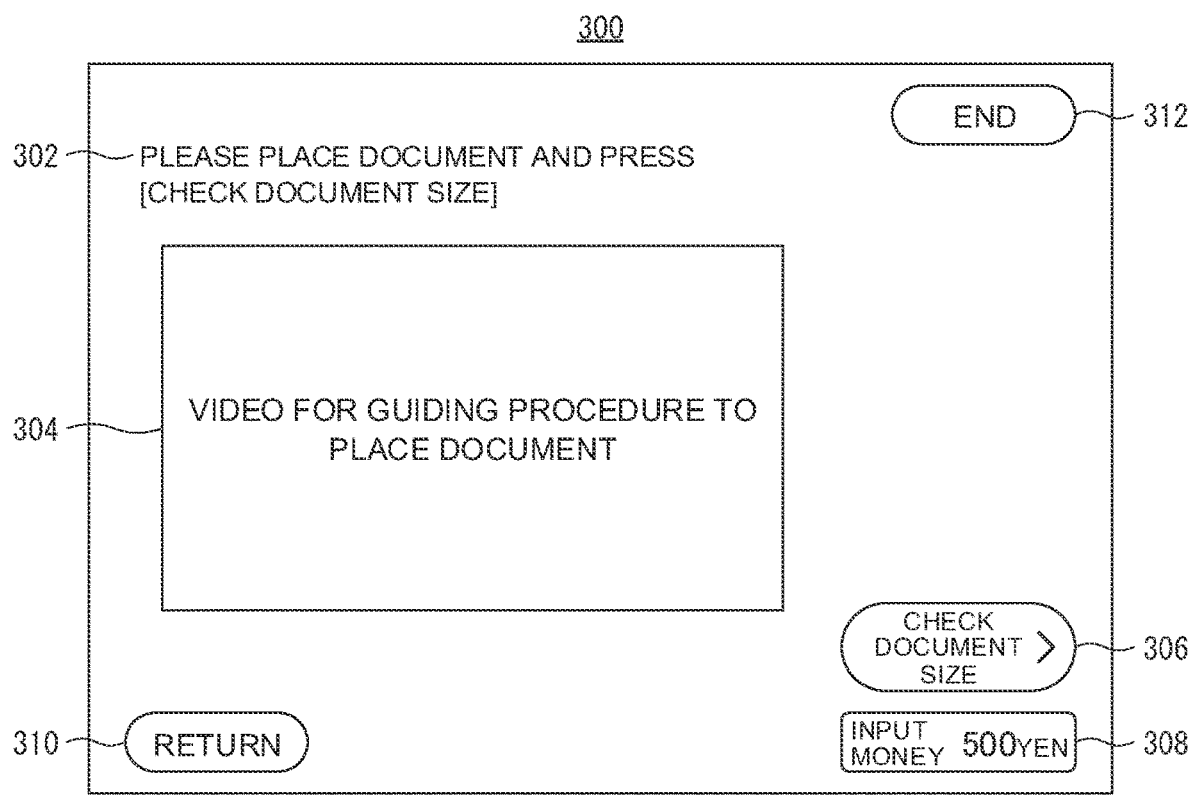
FIG. 3 is a diagram illustrating an example of a pre-scan guidance screen according to the first embodiment.

As is the case with the sheet selection screen 200 described above, an input-money display area 308, a "return" button 310, and an "end" button 312 are provided on the pre-scan guidance screen 300. For example, the input-money display area 308 in FIG. 3 illustrates an example where the input money at the present time is "500 yen". When the "return" button 310 is operated, the display 34a presents, instead of the pre-scan guidance screen 300, the above-described sheet selection screen 200, which is the screen immediately before the pre-scan guidance screen 300. When the "end" button 312 is operated, the display 34a presents, instead of the pre-scan guidance screen 300, the end confirmation screen (not illustrated) that is the same as the one described above. When the "Yes" button is operated on the end confirmation screen, the display 34a presents the above-described home screen instead of the end confirmation screen. Conversely, when the "No" button is operated on the end confirmation screen, the display 34a presents the pre-scan guidance screen 300 again instead of the end confirmation screen.

It is assumed that, while the pre-scan guidance screen 300 is displayed, the document 100 is placed on the platen 12a and the "check document size" button 306 is operated. Accordingly, a document size identification process including pre-scan is performed. The size of the document 100 is identified during the document size identification process including the pre-scan.

Figure 4:
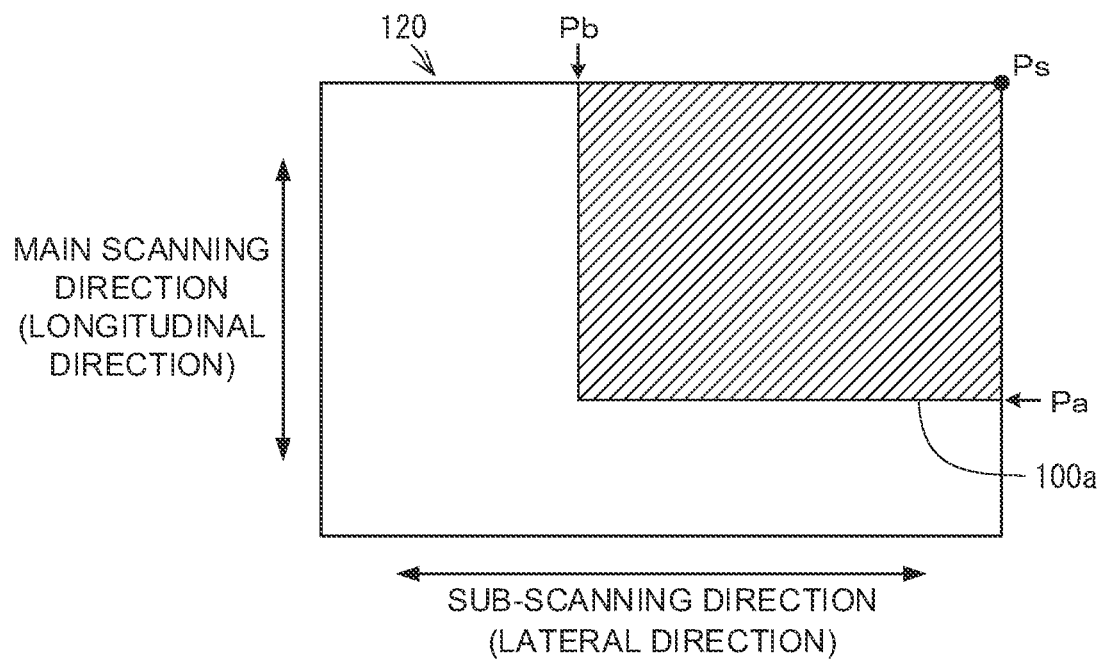
FIG. 4 is a diagram illustrating an example of a procedure for a document size identification process according to the first embodiment.

It is assumed that, for example, the document 100 is shaped like a single rectangular sheet and a read image 120 (image data) illustrated in FIG. 4 is obtained during pre-scan. The vertical direction in FIG. 4 corresponds to the main scanning direction of the image reader 12, i.e., the extending direction of the above-described line sensor (the direction in which the light receiving elements of the line sensor are arranged). The main scanning direction corresponds to the longitudinal direction of the platen 12a. The horizontal direction in FIG. 4 corresponds to the sub-scanning direction of the image reader 12, i.e., the moving direction of the image read position by the above-described image read unit. The sub-scanning direction corresponds to the lateral direction of the platen 12a. An origin Ps in FIG. 4 is the (coordinate) origin of the read image 120 and corresponds to the reference position of the platen 12a (the reference position to place the document 100).

With the read image 120 illustrated in FIG. 4, the outline portion of the document 100 is specified during for example a known edge detection process, and strictly speaking, the outline portion of a document image 100a of the document 100 is specified. A position Pa of the portion farthest from the origin Ps in the outline portion of the document image 100a is specified in the main scanning direction (the longitudinal direction of the platen 12a). The dimension of the document 100 in the main scanning direction is determined based on the distance between the origin Ps and the position Pa farthest from the origin Ps in the main scanning direction. Also, a position Pb of the portion farthest from the origin Ps in the outline portion of the document image 100a is specified in the sub-scanning direction (the lateral direction of the platen 12a). The dimension of the document 100 in the sub-scanning direction is determined based on the distance between the origin Ps and the position Pb farthest from the origin Ps in the sub-scanning direction. In this manner, the dimensions of the document 100 in the main scanning direction and in the sub-scanning direction are determined, that is, the size of the document 100 is identified.

Figure 5:
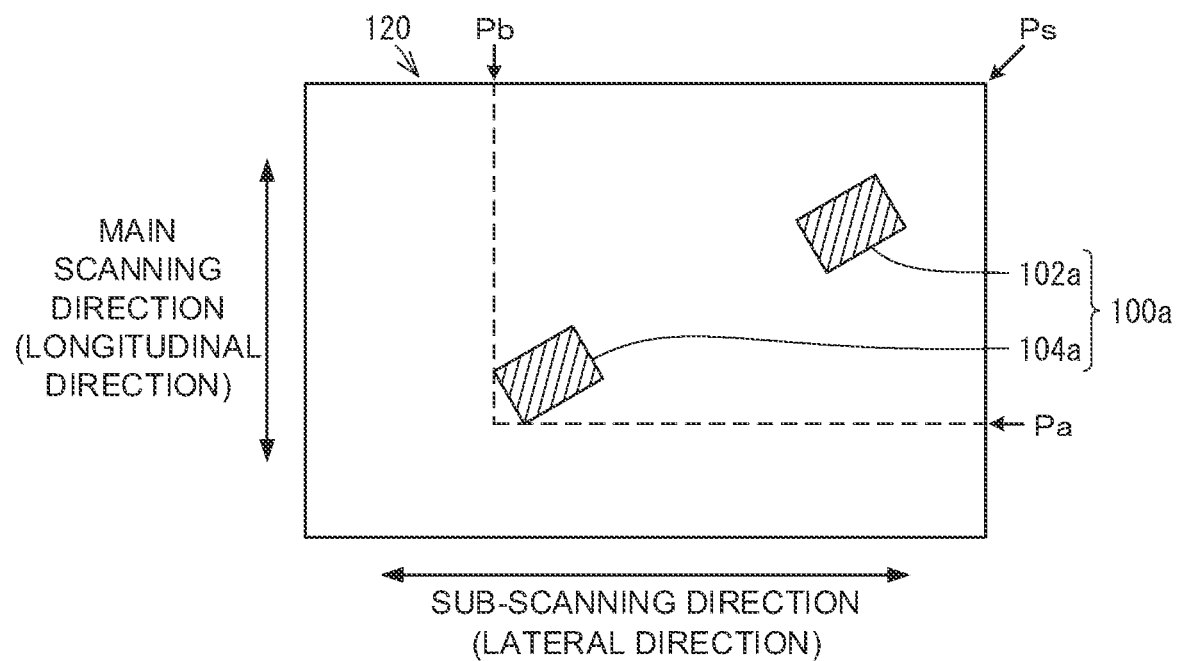
FIG. 5 is a diagram illustrating an example of the procedure for the document size identification process in another situation according to the first embodiment.

It is assumed that, for example, two objects shaped like a card, such as a business card, are randomly placed on the platen 12a as the document 100 and the read image 120 illustrated in FIG. 5 is obtained during pre-scan. In the read image 120 illustrated in FIG. 5, two document images 102a and 104a are treated as the single document image 100a including the document images 102a and 104a. Specifically, the respective outline portions of the two document images 102a and 104a are specified during the above-described edge detection process. Then, the position Pa of the portion farthest from the origin Ps in the main scanning direction in the respective outline portions of the two document images 102a and 104a is specified. The dimension of the entire document 100 in the main scanning direction is determined based on the distance between the origin Ps and the position Pa farthest from the origin Ps in the main scanning direction. Also, the position Pb of the portion farthest from the origin Ps in the sub-scanning direction in the respective outline portions of the document images 102a and 104a is specified. The dimension of the entire document 100 in the sub-scanning direction is determined based on the distance between the origin Ps and the position Pb farthest from the origin Ps in the sub-scanning direction. In this manner, the dimension of the entire document 100 in the main scanning direction and in the sub-scanning direction are determined, that is, the size of the entire document 100 is identified.

Although the detailed description including illustration is omitted, the size of the document 100 is specified in the same procedure even when the document 100 has a thickness like a book or has a different form. During the document size identification process to identify the size of the document 100, the edge detection process is performed as described above, and the edge detection process is performed by the image processor 14.

After the size of the document 100 is identified as described above, the optimal sheet size identification process is performed to identify the optimal sheet size corresponding to the size of the document 100. As described above, for example, when the size of the document 100 matches any of the sizes of sheets prepared in the multifunction peripheral 10, the size of the sheet matching the size of the document 100 is identified as the optimal sheet size. Conversely, when the size of the document 100 does not match any of the sizes of sheets prepared in the multifunction peripheral 10, the smallest one of the sizes larger than the size of the document 100 among the sizes of the sheets prepared in the multifunction peripheral 10 is identified as the optimal sheet size.

Figure 6:
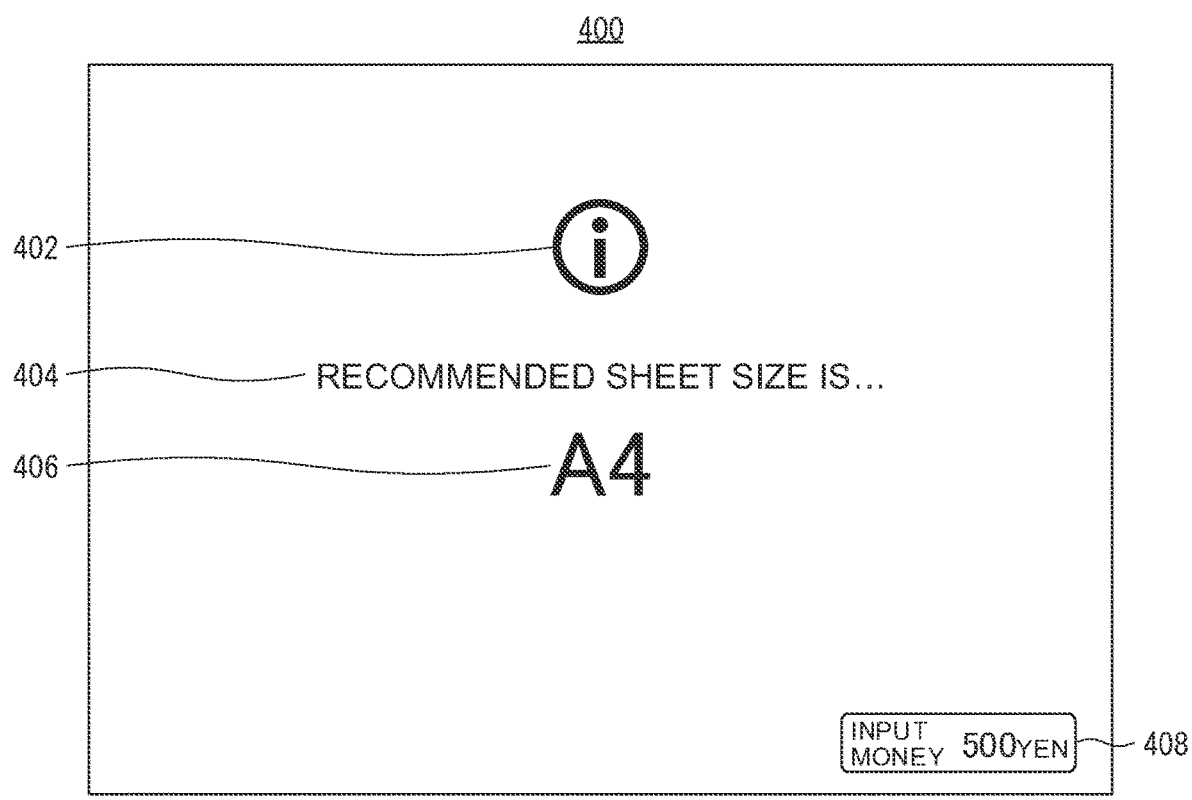
FIG. 6 is a diagram illustrating an example of an optimal sheet size presentation screen according to the first embodiment.

After the optimal sheet size is identified, the display 34a presents an optimal sheet size presentation screen 400 illustrated in FIG. 6. While the document size identification process including the pre-scan is performed after the "check document size" button 306 is operated on the above-described pre-scan guidance screen 300 and then the optimal sheet size identification process is performed, the display 34a presents a pre-scan in-execution message screen (not illustrated) instead of the pre-scan guidance screen 300. The pre-scan in-execution message screen includes an appropriate text indicating that the pre-scan is in execution. After the document size identification process including the pre-scan is finished and the optimal sheet size is identified during the optimal sheet size identification process, the display 34*a* presents the optimal sheet size presentation screen 400 instead of the pre-scan in-execution message screen.

The optimal sheet size presentation screen 400 is a screen to present the optimal sheet size that is identified during the document size identification process. An appropriate mark 402 indicating that the optimal sheet size has been identified, in other words, indicating that the optimal sheet size has been successfully identified, is provided on, for example, the upper portion of the optimal sheet size presentation screen 400. Appropriate texts 404 and 406 indicating the optimal sheet size are provided under the mark 402 in two lines in the vertical direction. FIG. 6 illustrates an example of the optimal sheet size presentation screen 400 when the "A4" size is identified as the optimal sheet size. Therefore, the user may recognize the optimal sheet size corresponding to the size of the document 100 from the optimal sheet size presentation screen 400, particularly the contents of the texts 404 and 406. Although the optimal sheet size is represented by using the two texts 404 and 406 in FIG. 6, the optimal sheet size may be represented by using other formats, for example, by using a single text.

An input-money display area 408 is also provided on the optimal sheet size presentation screen 400 as on the sheet selection screen 200 and the pre-scan guidance screen 300 described above. The input-money display area 408 in FIG. 6 illustrates that the input money is "500 yen" at the present time.

The optimal sheet size presentation screen 400 is displayed for a certain period of time, for example, a relatively short period of time, e.g., several seconds (approximately two seconds to three seconds). Then, the display 34*a* presents the sheet selection screen 200 illustrated FIG. 7 instead of the optimal sheet size presentation screen 400. That is, the display 34*a* presents the sheet selection screen 200 again.

Figure 7:
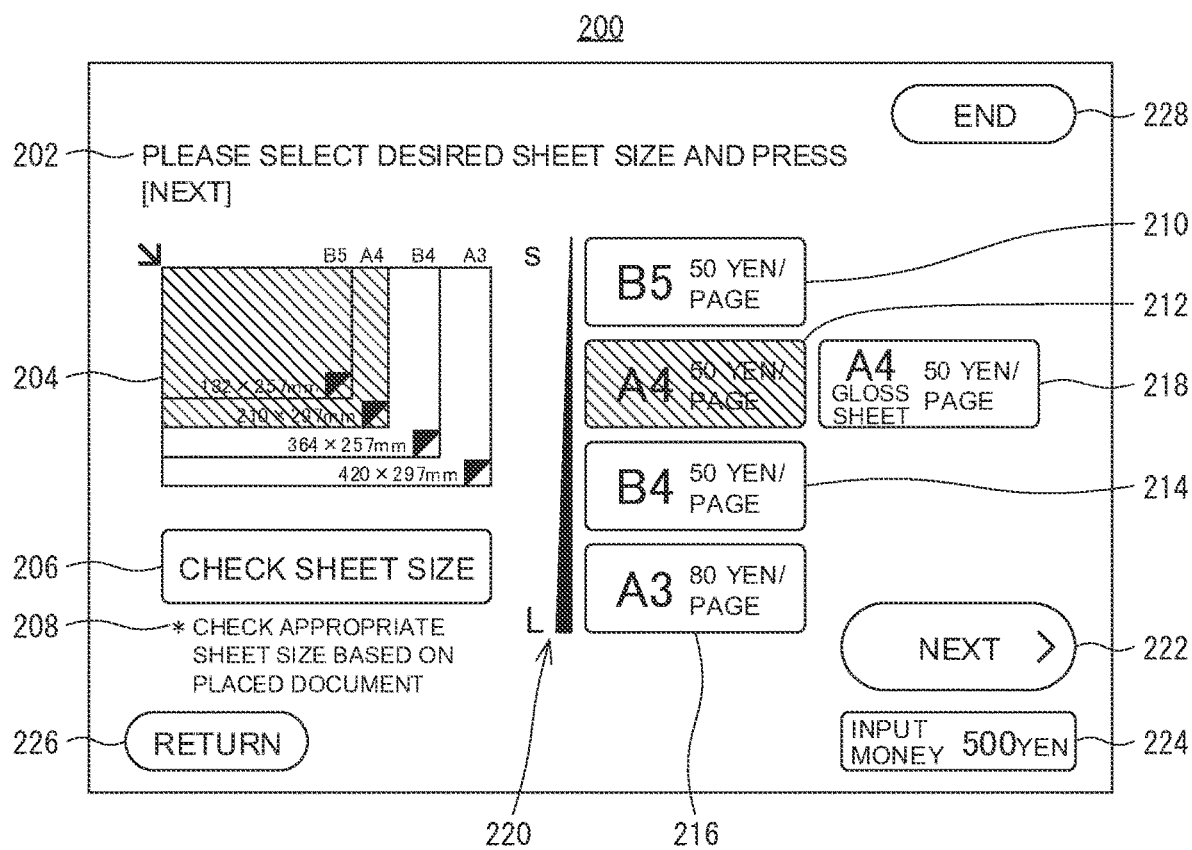
FIG. 7 is a diagram illustrating an example of the sheet selection screen in another state according to the first embodiment.

On the sheet selection screen 200 illustrated in FIG. 7, the sheet selection button 212 corresponding to the A4-size sheet identified as the optimal sheet size, strictly speaking, the A4-size regular sheet, is modified as appropriate, for example, is colored as appropriate. Also, the portion corresponding to A4 size in the schematic diagram 204 is modified as appropriate, for example, is colored as appropriate. Thus, it is indicated that an A4-size regular sheet has been selected as the output destination. That is, when the optimal sheet size is identified by the optimal sheet size identification function, a sheet having the optimal sheet size is automatically selected as the output destination sheet. The user may recognize the optimal sheet size from the sheet selection screen 200 having the above-described form.

When the sheet selection button 212 corresponding to an A4-size regular sheet is operated on the sheet selection screen 200 (that is, when the output destination sheet has not been selected) illustrated in FIG. 2, the sheet selection screen 200 transitions to the same state as the one illustrated in FIG. 7. When any of the sheet selection buttons 210, 214, 216, and 218 other than the sheet selection button 212 is operated on the sheet selection screen 200 illustrated in FIG. 7, the sheet corresponding to the selected one of the sheet selection buttons 210, 214, 216, and 218 is selected as the output destination. That is, after a certain sheet is selected as the output destination, the selection content may be optionally changed. In this case, the sheet selection button 210, 214, 216, or 218 corresponding to the sheet newly selected as the output destination is colored as appropriate, and the corresponding portion in the schematic diagram 204 is colored as appropriate. When an A4-size gloss sheet is selected as the output destination, the sheet selection button 218 corresponding to the A4-size gloss sheet is colored as appropriate while the same portion as the one colored when an A4-size regular sheet is selected as the output destination is colored as appropriate in the schematic diagram 204.

When the output destination sheet is selected as illustrated in FIG. 7, the grayout of the "next" button 222 is canceled so that the "next" button 222 enters a state so as to receive an operation. When the "next" button 222 is operated, the sheet selected as the output destination as described above is set (confirmed) as the output destination. Then, the display 34*a* presents a document reading operation screen (not illustrated) instead of the sheet selection screen 200. Afterward, the remaining operations necessary for copying, including an operation on the document reading operation screen, are performed as appropriate, and thus the copying is executed. When the "check sheet size" button 206 is operated while the output destination sheet is selected as illustrated in FIG. 7, the optimal sheet size identification function is started again.

Figure 8:
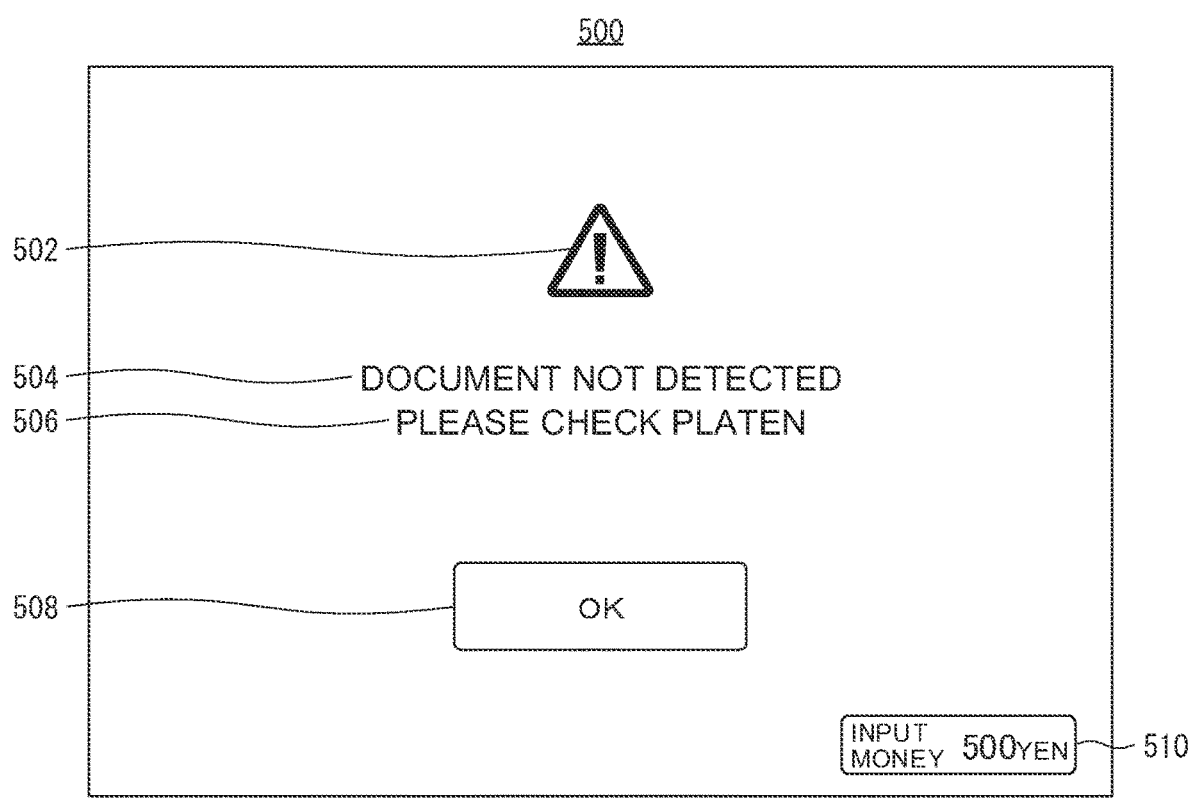
FIG. 8 is a diagram illustrating an example of a document detection error screen according to the first embodiment.

When the size of the document 100 is not identified during the document size identification process including the above-described pre-scan, specifically when the outline portion of the document 100 is not specified, the display 34*a* presents the document detection error screen 500 illustrated in FIG. 8. The document detection error screen 500 is displayed after the above-described pre-scan in-execution message screen.

An appropriate mark 502 indicating that the document 100 has not been detected, in other words, indicating that the detection of the document 100 has failed, is provided on, for example, the upper portion of the document detection error screen 500. An appropriate text 504 indicating that the document 100 has not been detected and an appropriate text 506 having the content prompting the user to check whether the document 100 is properly placed on the platen 12*a* are provided under the mark 502 in two lines in the vertical direction. An "OK" button 508 is provided under the text 506. The "OK" button 508 is an operator to receive the user's operation as an answer to the display of the document detection error screen 500. An input-money display area 510 is also provided on the document detection error screen 500 as on the sheet selection screen 200, and the like. The input-money display area 510 in FIG. 8 illustrates that the input money is "500 yen" at the present time.

When the "OK" button 508 is operated on the document detection error screen 500, the display 34*a* presents the above-described pre-scan guidance screen 300 instead of the document detection error screen 500. After the document 100 is properly placed on the platen 12*a* while the pre-scan guidance screen 300 is displayed, the "check document size" button 306 is operated again.

Figure 9:
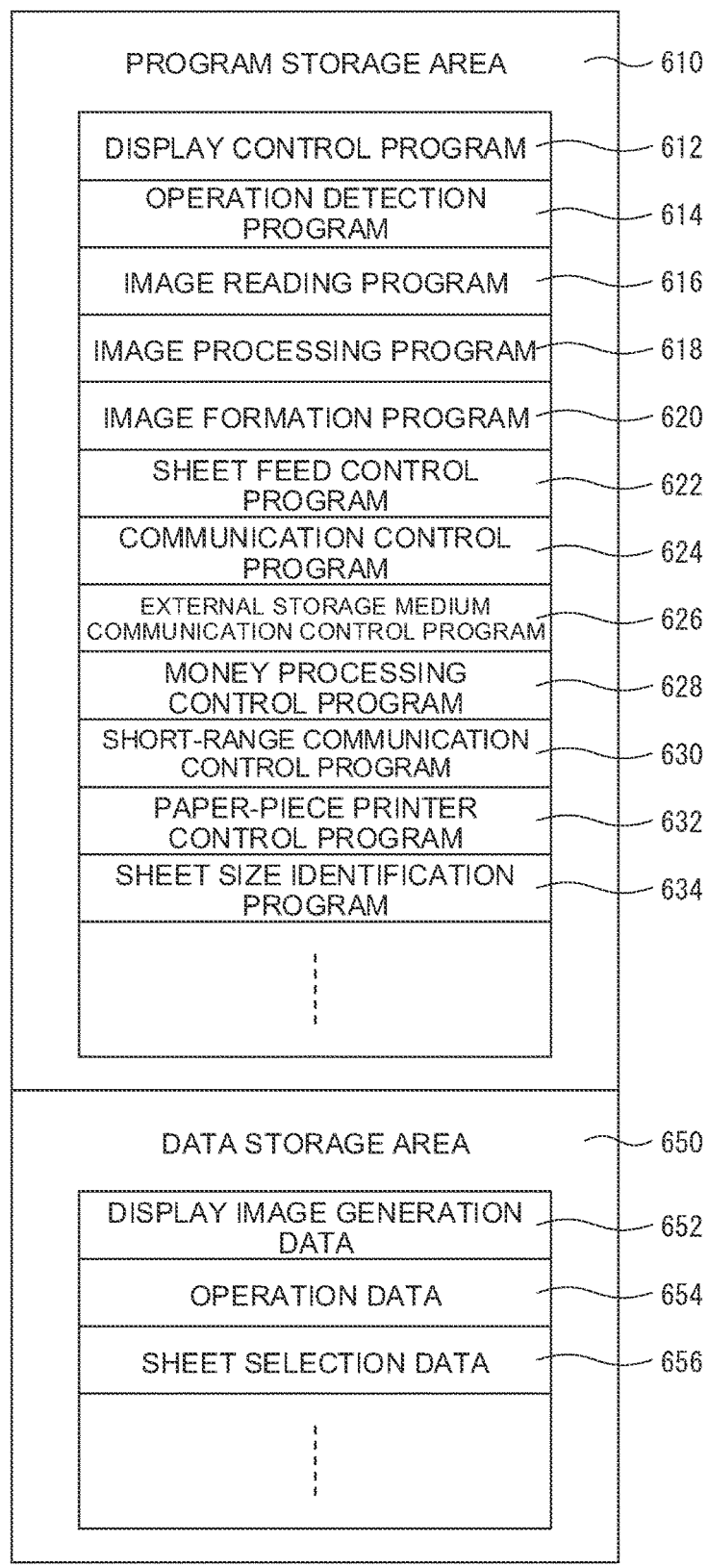
FIG. 9 is a memory map illustrating a conceptual configuration of a RAM of a main storage according to the first embodiment.

FIG. 9 illustrates a memory map 600 that represents the conceptual configuration of the RAM in the main storage 20*b*.

As illustrated in the memory map 600, the RAM includes a program storage area 610 and a data storage area 650. The program storage area 610 stores the above-described control program. Specifically, the control program includes a display control program 612, an operation detection program 614, an image reading program 616, an image processing program 618, an image formation program 620, and a sheet feed control program 622. The control program further includes a communication control program 624, an external storage medium communication control program 626, a money processing control program 628, a short-range communication control program 630, and a paper-piece printer control program 632. The control program further includes a sheet size identification program 634, etc.

The display control program 612 is a program to generate the display screen data necessary for displaying various screens such as the above-described home screen on the display 34a. The operation detection program 614 is a program to detect the operation status for the touch panel 34b. The image reading program 616 is a program to control the image reader 12. The image processing program 618 is a program to control the image processor 14. The image formation program 620 is a program to control the image former 16. The sheet feed control program 622 is a program to control the sheet feeder 18. The communication control program 624 is a program to control the communicator 24. The external storage medium communication control program 626 is a program to control the external storage medium communicator 26. The money processing control program 628 is a program to control the money processor 28. The short-range communication control program 630 is a program to control the short-range communicator 30. The paper-piece printer control program 632 is a program to control the paper piece printer 32. The sheet size identification program 634 is a program that causes the CPU 20a to execute a sheet size identification task described below.

The data storage area 650 stores various types of data. The various types of data include display image generation data 652, operation data 654, sheet selection data 656, etc.

The display image generation data 652 is data such as polygon data or texture data used to generate the display screen data based on the display control program 612 described above. The operation data 654 is data indicating the operation status for the touch panel 34b, specifically, time-series data representing the user's touch position (coordinates) with respect to the touch panel 34b. The sheet selection data 656 is data about the sheet selected as the output destination. The sheet corresponding to the sheet selection data 656 is set as the output destination.

Figure 10:
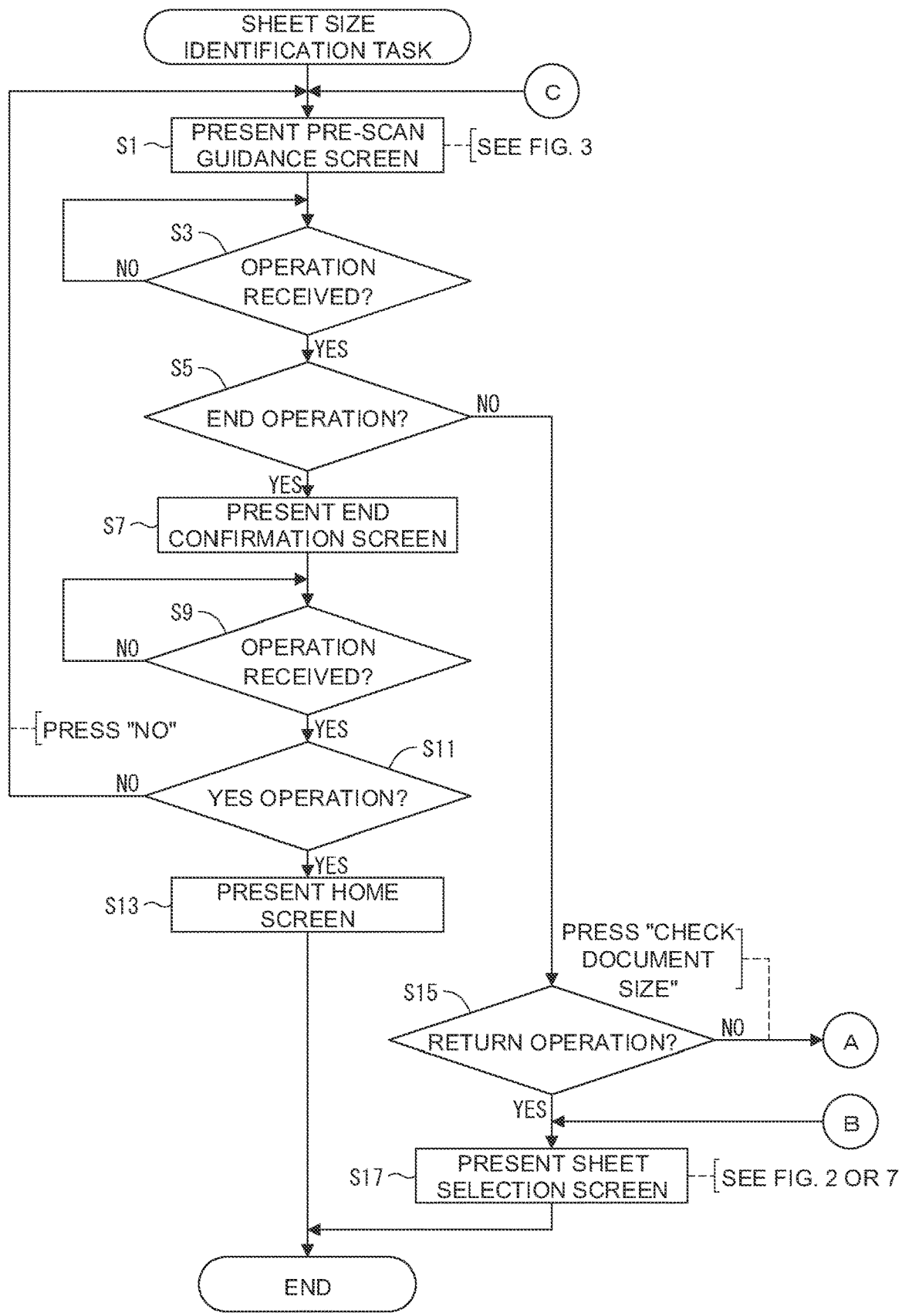
FIG. 10 is a flowchart illustrating the flow of part of a sheet size identification task according to the first embodiment.
Figure 11:
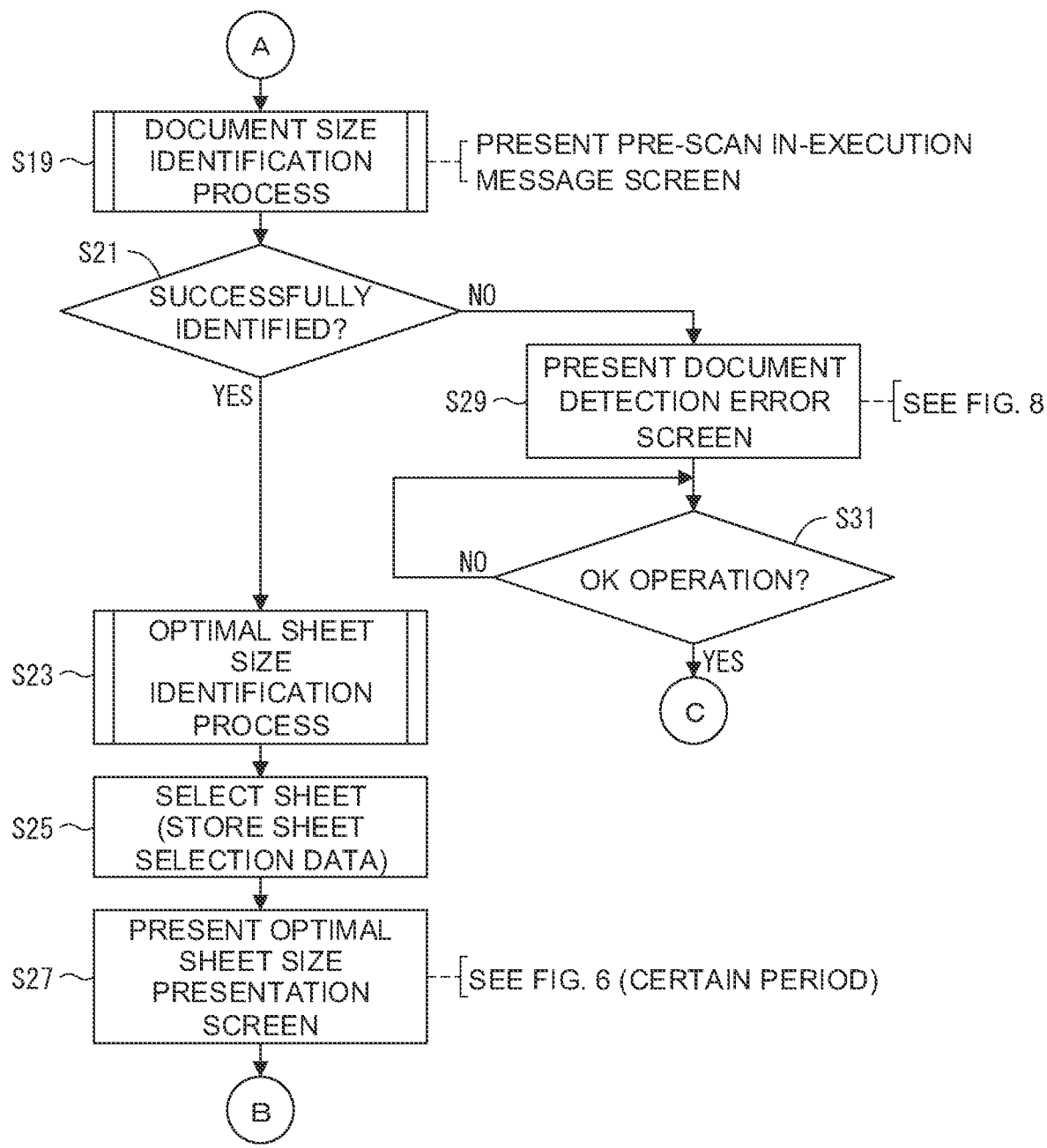
FIG. 11 is a flowchart illustrating the flow of the remaining part of the sheet size identification task according to the first embodiment.

As described above, when the "check sheet size" button 206 is operated on the sheet selection screen 200, the optimal sheet size identification function is started, that is, the identification of the optimal sheet size using the optimal sheet size identification function is started. Specifically, the CPU 20a executes the sheet size identification task. The sheet size identification task is executed in accordance with the sheet size identification program 634. FIGS. 10 and 11 illustrate the flow of the sheet size identification task.

According to the sheet size identification task, the CPU 20a first causes the display 34a to present the pre-scan guidance screen 300 at Step S1 (FIG. 10), strictly speaking, to present the pre-scan guidance screen 300 instead of the previously displayed sheet selection screen 200. Then, the CPU 20a proceeds to the process at Step S3.

At Step S3, the CPU 20a waits until any user's operation is received through the pre-scan guidance screen 300 (S3: NO). When any operation is received through the pre-scan guidance screen 300 (S3: YES), the CPU 20a proceeds to the process at Step S5.

At Step S5, the CPU 20a determines whether the operation received at Step S3 is the operation (pressing) of the "end" button 312 on the pre-scan guidance screen 300. For example, when the operation received at Step S3 is the operation of the "end" button 312 (S5: YES), the CPU 20a proceeds to the process at Step S7. Conversely, when the operation received at Step S3 is not the operation of the "end" button 312, that is, when the operation is an operation other than the operation of the "end" button 312 (S5: NO), the CPU 20a proceeds to the process at Step S15 described below.

At Step S7, the CPU 20a causes the display 34a to present the above-described end confirmation screen, strictly speaking, to present the end confirmation screen instead of the pre-scan guidance screen 300. Then, the CPU 20a proceeds to the process at Step S9.

At Step S9, the CPU 20a waits until any user's operation is received through the end confirmation screen (S9: NO). When any operation is received through the end confirmation screen (S9: YES), the CPU 20a proceeds to the process at Step S11.

At Step S11, the CPU 20a determines whether the operation received at Step S9 is the operation of the above-described "Yes" button on the end confirmation screen. For example, when the operation received at Step S9 is the operation of the "Yes" button on the end confirmation screen (S11: YES), the CPU 20a proceeds to the process at Step S13. Conversely, when the operation received at Step S9 is not the operation of the "Yes" button, that is, the operation of the "No" button (S11: NO), the CPU 20a returns to the process at Step S1. Accordingly, the display 34a presents the pre-scan guidance screen 300 again instead of the end confirmation screen.

At Step S13, the CPU 20a causes the display 34a to present the above-described home screen, strictly speaking, to present the home screen instead of the end confirmation screen. Accordingly, the multifunction peripheral 10 enters a standby state. After Step S13 is executed, the CPU 20a ends the sheet size identification task.

When the process proceeds from Step S5 described above to Step S15, the CPU 20a determines whether the operation received at Step S3 described above is the operation of the "return" button 310 on the pre-scan guidance screen 300 at Step S15. For example, when the operation received at Step S3 is the operation of the "return" button 310 (S15: YES), the CPU 20a proceeds to the process at Step S17. Conversely, the operation received at Step S3 is not the operation of the "return" button 310, that is, the operation of the "check document size" button 306 (S15: NO), the CPU 20a proceeds to the process at Step S19 (FIG. 11) described below.

At Step S17, the CPU 20a causes the display 34a to present the sheet selection screen 200, strictly speaking, to present the sheet selection screen 200 instead of the pre-scan guidance screen 300. Then, the CPU 20a ends the sheet size identification task.

When the process proceeds from Step S15 described above to Step S19, the CPU 20a performs the document size identification process including the above-described pre-scan at Step S19. Also, the CPU 20a causes the display 34a to present the above-described pre-scan in-execution message screen, strictly speaking, to present the pre-scan in-execution message screen instead of the pre-scan guidance screen 300. After the document size identification process is performed at Step S19, the CPU 20a proceeds to the process at Step S21.

At Step S21, the CPU 20a determines whether the size of the document 100 has been properly identified during the document size identification process at Step S19, that is, whether the size of the document 100 has been successfully identified. For example, when the size of the document 100 has been successfully identified (S21: YES), the CPU 20a proceeds to the process at Step S23. Conversely, when the identification of the document 100 has failed (S21: NO), the CPU 20*a* proceeds to the process at Step S29 described below.

At Step S23, the CPU 20*a* performs the above-described optimal sheet size identification process. Thus, the optimal sheet size corresponding to the size of the document 100 is identified. Then, the CPU 20*a* proceeds to the process at Step S25.

At Step S25, the CPU 20*a* selects the optimal sheet size identified during the optimal sheet size identification process at Step S23 as the size of the sheet that is the output destination, that is, selects the output destination sheet. Specifically, the CPU 20*a* stores the data about a regular sheet of the size corresponding to the optimal sheet size in the main storage 20*b* (RAM) as the above-described sheet selection data 656. Therefore, for example, when the optimal sheet size is A4 size, the data about a regular sheet of A4 size is stored in the main storage 20*b* as the sheet selection data 656 (that is, the data about an A4-size gloss sheet is not stored as the sheet selection data 656). After Step S25 is performed, the CPU 20*a* proceeds to the process at Step S27.

At Step S27, the CPU 20*a* causes the display 34*a* to present the optimal sheet size presentation screen 400, strictly speaking, to present the optimal sheet size presentation screen 400 instead of the above-described pre-scan in-execution message screen. As described above, the optimal sheet size presentation screen 400 is displayed for a certain period of time (several seconds). Then, the CPU 20*a* proceeds to the process at Step S17. Accordingly, the display 34*a* presents the sheet selection screen 200 instead of the optimal sheet size presentation screen 400. Here, the sheet selection screen 200 is displayed in the mode corresponding to the sheet selection data 656 stored at Step S25, that is, is displayed in the mode indicating that the sheet corresponding to the sheet selection data 656 has been selected as the output destination.

When the process proceeds from Step S21 described above to Step S29, the CPU 20*a* causes the display 34*a* to present the document detection error screen 500 at Step S29, strictly speaking, to present the document detection error screen 500 instead of the pre-scan in-execution message screen. Then, the CPU 20*a* proceeds to the process at Step S31.

At Step S31, the CPU 20*a* waits until the user's operation is received through the document detection error screen 500, that is, the "OK" button 508 is operated on the document detection error screen 500 (S31: NO). When the "OK" button 508 has been operated (S31: YES), the CPU 20*a* returns to the process at Step S1. Accordingly, the display 34*a* presents the pre-scan guidance screen 300 again instead of the document detection error screen 500.

As described above, according to the first embodiment, when the "check sheet size" button 206 provided on the sheet selection screen 200 is operated, the optimal sheet size identification function is started. Accordingly, the optimal sheet size corresponding to the size of the document 100 is automatically identified, and the sheet corresponding to the optimal sheet size is automatically selected as the output destination. This is extremely advantageous for, for example, a user who is not familiar with the handling of the multifunction peripheral 10, especially a user who does not know the size of the document 100 (and does not have a way to measure the size of the document 100). On the other hand, for a user who knows the size of the document 100, it may be advantageous to optionally select the output destination sheet without using the optimal sheet size identification function, which is achieved according to the first embodiment. That is, according to the first embodiment, it is possible to provide the multifunction peripheral 10 that is user-friendly for users who know and who do not know the size of the document 100.

The "check sheet size" button 206 according to the first embodiment is an example of a first operation receiver according to the present invention. The sheet selection screen 200 including the "check sheet size" button 206 is an example of a first screen according to the present invention. The CPU 20*a* causes the display 34*a* to present the sheet selection screen 200, and the CPU 20*a* causing the presentation of the sheet selection screen 200 is an example of a first display controller according to the present invention.

The CPU 20*a* executing the document size identification process at Step S19 (FIG. 11) in the above-described sheet size identification task is an example of a document size identifier according to the present invention. The CPU 20*a* executing the optimal sheet size identification process at Step S23 in the sheet size identification task is an example of a suitable size identifier according to the present invention. The optimal sheet size according to the first embodiment is an example of a suitable size according to the present invention.

The optimal sheet size presentation screen 400 according to the first embodiment is an example of a second screen according to the present invention. The CPU 20*a* that causes the display of the optimal sheet size presentation screen 400, that is, the CPU 20*a* that executes Step S27 (FIG. 11) in the sheet size identification task is an example of a second display controller according to the present invention. The CPU 20*a* that executes Step S25 (FIG. 11) in the sheet size identification task, that is, the CPU 20*a* that causes the sheet selection data 656 to be stored in the main storage 20*b* is an example of a first setter according to the present invention.

The sheet selection buttons 210, 212, 214, 216, and 218 provided on the sheet selection screen 200 according to the first embodiment are examples of a second operation receiver according to the present invention. As described above, when any of the sheet selection buttons 210, 212, 214, 216, and 218 is operated, the sheet corresponding to the operated sheet selection button 210, 212, 214, 216 or 218 is selected as the output destination. The main storage 20*b* stores, as the sheet selection data 656, the data about the sheet selected as the output destination. The CPU 20*a* causes the sheet selection data 656 to be stored in the main storage 20*b*, and the CPU 20*a* causing the storage of the sheet selection data 656 is an example of a first size changer according to the present invention.

Second Embodiment

Next, a second embodiment of the present invention is described.

Figure 12:
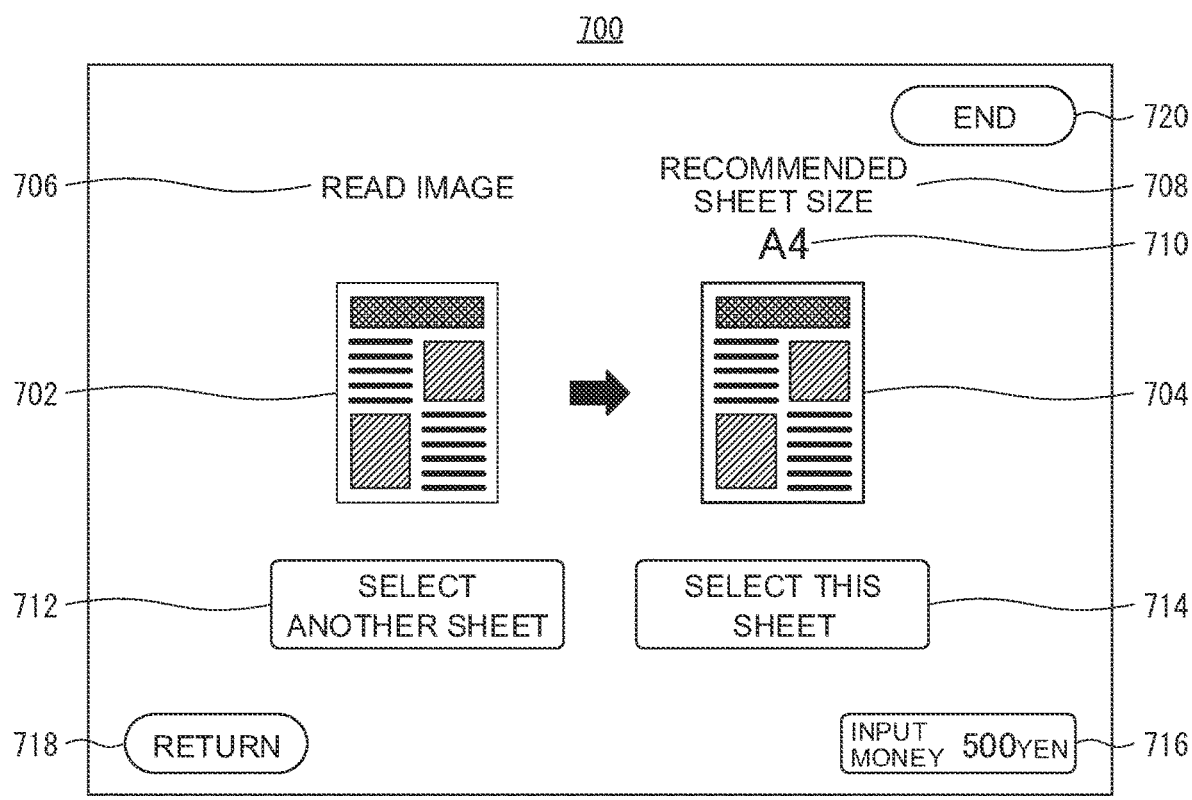
FIG. 12 is a diagram illustrating an example of an optimal sheet size presentation screen with a preview according to a second embodiment of the present invention.

As described above, according to the first embodiment, when the optimal sheet size is identified, the optimal sheet size presentation screen 400 illustrated in FIG. 6 is presented. On the other hand, according to the second embodiment, when the optimal sheet size is identified, an optimal sheet size presentation screen 700 with a preview illustrated in FIG. 12 is presented. Although the optimal sheet size presentation screen 400 according to the first embodiment is displayed for a certain period of time, the optimal sheet size presentation screen 700 with a preview according to the second embodiment is continuously displayed until an appropriate operation is received from the user. Hereinafter, the optimal sheet size presentation screen 700 with a preview according to the second embodiment is sometimes simply referred to as the "optimal sheet size presentation screen 700".

As illustrated in FIG. 12, a thumbnail image (thumbnail) 702 based on the read image of the document 100 obtained during the above-described pre-scan is provided at, for example, a position on the left side near the center of the optimal sheet size presentation screen 700 according to the second embodiment. A preview image (preview) 704 in a case where the image of the document 100 is output (printed) to the sheet corresponding to the optimal sheet size is provided on the right side of the thumbnail image 702, that is, alongside of the thumbnail image 702. Based on the optimal sheet size presentation screen 700, especially the preview image 704, the user may intuitively recognize the result of the printed material that is expected when the sheet having the optimal sheet size is the output destination.

An appropriate text 706 indicating that the thumbnail image 702 is based on the image read during pre-scan is provided above the thumbnail image 702 on the optimal sheet size presentation screen 700. Furthermore, appropriate texts 708 and 710 representing the optimal sheet size are provided above the preview image 704 in two lines in the vertical direction. Therefore, the user may recognize the optimal sheet size from the content of the texts 708 and 710. FIG. 12 illustrates an example of the optimal sheet size presentation screen 700 when "A4" size is identified as the optimal sheet size. Although the optimal sheet size is represented by using the two texts 708 and 710 in FIG. 12, the optimal sheet size may be represented by using other formats, for example, by using a single text.

A "select another sheet" button 712 is provided under the thumbnail image 702 on the optimal sheet size presentation screen 700. The "select another sheet" button 712 is an operator to select, as the output destination, a sheet other than the sheet corresponding to the optimal sheet size, in other words, to transition to a preview comparison screen 800 described below. A "select this sheet" button 714 is provided under the preview image 704. The "select this sheet" button 714 is an operator to select the optimal sheet size as the size of the output destination sheet, in other words, to transition to the above-described sheet selection screen 200.

An input-money display area 716, a "return" button 718, and an "end" button 720 are also provided on the optimal sheet size presentation screen 700 as on the above-described sheet selection screen 200. For example, the input-money display area 716 in FIG. 12 illustrates that the input money is "500 yen" at the present time. When the "return" button 718 is operated, the display 34*a* presents the above-described pre-scan guidance screen 300 instead of the optimal sheet size presentation screen 700. When the "end" button 720 is operated, the display 34*a* presents the end confirmation screen (not illustrated), which is the same as that described above, instead of the optimal sheet size presentation screen 700. When the "Yes" button is operated on the end confirmation screen, the display 34*a* presents the above-described home screen instead of the end confirmation screen. Conversely, when the "No" button is operated on the end confirmation screen, the display 34*a* presents the optimal sheet size presentation screen 700 again instead of the end confirmation screen.

For example, when the "select this sheet" button 714 is operated on the optimal sheet size presentation screen 700, the display 34*a* presents the sheet selection screen 200 instead of the optimal sheet size presentation screen 700. Specifically, it is assumed that the "select this sheet" button 714 is operated on the optimal sheet size presentation screen 700 in the mode indicating that A4 size has been identified as the optimal sheet size as illustrated in FIG. 12, for example. Accordingly, the sheet selection screen 200 is displayed in the mode illustrated in FIG. 7, that is, in the mode indicating that the sheet (regular sheet) corresponding to the optimal sheet size, i.e., A4 size, has been selected as the output destination.

Figure 13:
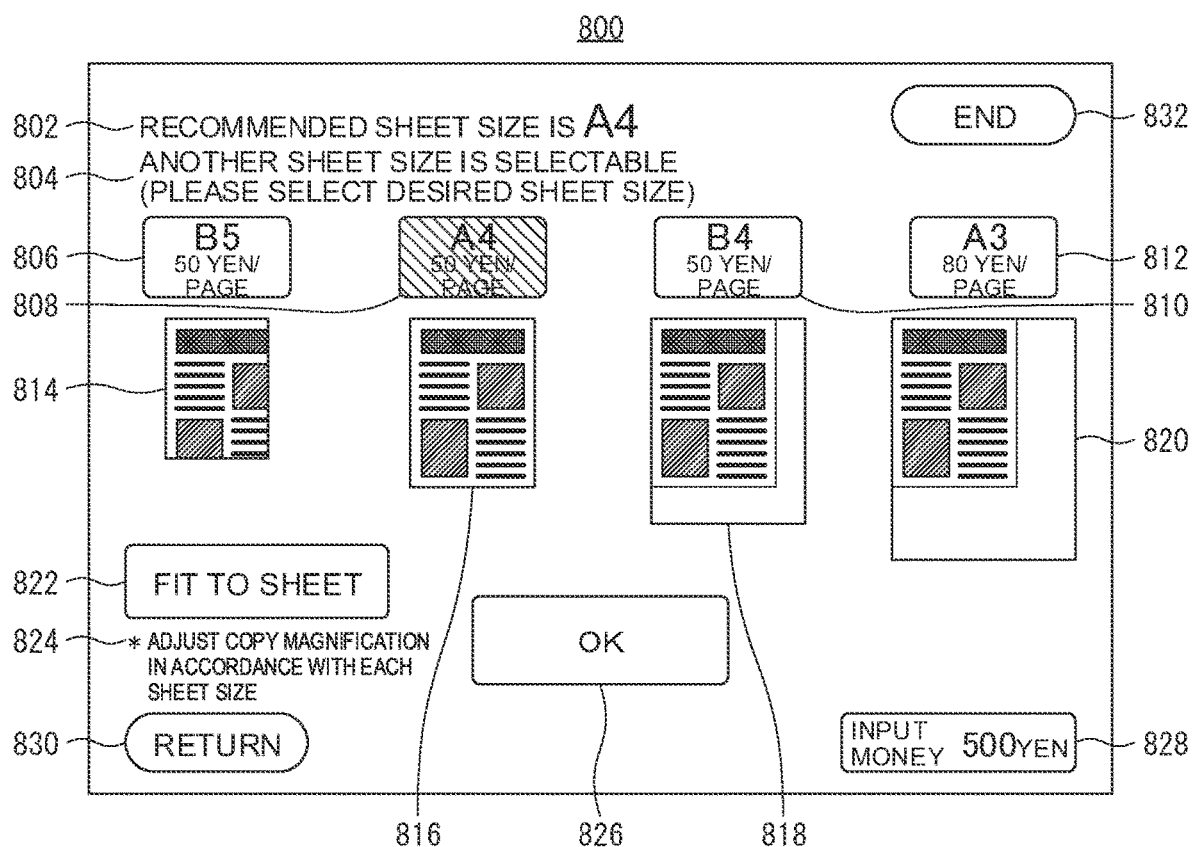
FIG. 13 is a diagram illustrating an example of a preview comparison screen according to the second embodiment.

When the "select another sheet" button 712 is operated on the optimal sheet size presentation screen 700, the display 34*a* presents the preview comparison screen 800 illustrated in FIG. 13 instead of the optimal sheet size presentation screen 700. FIG. 13 is an example of the preview comparison screen 800 that is displayed when the "select another sheet" button 712 is operated on the optimal sheet size presentation screen 700 in the mode indicating that A4 size has been identified as the optimal sheet size as illustrated in FIG. 12.

As illustrated in FIG. 13, an appropriate text 802 representing the optimal sheet size is provided on, for example, the upper portion of the preview comparison screen 800. An appropriate text 804 is provided under the text 802 to indicate that the size of the output destination sheet may be optionally selected. Four sheet size selection buttons 806, 808, 810, and 812 are arranged side by side under the text 804 to manually select the size of the output destination sheet. The four sheet size selection buttons 806, 808, 810, and 812 correspond to the respective sizes of sheets prepared in the multifunction peripheral 10, strictly speaking, correspond to the four sizes of regular sheets, i.e., B5 size, A4 size, B4 size, and A3 size. Each of the four sheet size selection buttons 806, 808, 810, and 812 is provided with an appropriate text representing the corresponding size of a regular sheet and an appropriate text indicating the copy fee per page in a case where the regular sheet of the corresponding size is the output destination. Furthermore, preview images 814, 816, 818, and 820 in a case where the image of the document 100 is output on the corresponding sheet at a uniform (common to each sheet size) magnification, i.e., one-fold (100%), are provided under the sheet size selection buttons 806, 808, 810, and 812, respectively.

A "fit to sheet" button 822 is provided at an appropriate position on the preview comparison screen 800, for example, under the preview image 814 corresponding to B5 size. The "fit to sheet" button 822 is an operator to display a preview image in a case where the image of the document 100 is output to the respective sheets of the four sizes, i.e., B5 size, A4 size, B4 size, and A3 size described above, at the respective magnifications corresponding to the four sizes. In other words, the "fit to sheet" button 822 is an operator to transition to a post-magnification adjustment comparison screen 900 described below. An appropriate text 824 representing a brief description of the "fit to sheet" button 822 is provided under the "fit to sheet" button 822.

An "OK" button 826 is provided on the right side of the "fit to sheet" button 822 and the text 824 on the preview comparison screen 800, in other words, at the center position of the lower portion of the preview comparison screen 800. The "OK" button 826 is an operator to apply the sheet size selected on the preview comparison screen 800 to the above-described sheet selection screen 200, in other words, an operator to transition to the sheet selection screen 200.

An input-money display area 828, a "return" button 830, and an "end" button 832 are also provided on the preview comparison screen 800 as on the optimal sheet size presentation screen 700. For example, the input-money display area 828 in FIG. 13 illustrates that the input money is "500 yen" at the present time. When the "return" button 830 is operated, the display 34*a* presents the optimal sheet size presentation screen 700, which is the screen immediately before the preview comparison screen 800, instead of the preview comparison screen 800. When the "end" button 832 is operated, the display 34*a* presents the end confirmation screen (not illustrated), which is the same as that described above, instead of the preview comparison screen 800. When the "Yes" button is operated on the end confirmation screen, the display 34*a* presents the above-described home screen instead of the end confirmation screen. Conversely, when the "No" button is operated on the end confirmation screen, the display 34*a* presents the preview comparison screen 800 again instead of the end confirmation screen.

When any of the sheet size selection buttons 806, 808, 810, and 812 is operated on the preview comparison screen 800, the sheet size corresponding to the operated sheet size selection button 806, 808, 810, or 812 is selected as the size of the output destination sheet. The sheet size selection button 806, 808, 810, or 812 corresponding to the selected sheet size (that is, operated) is modified as appropriate, for example, is colored as appropriate. FIG. 13 illustrates an example of the preview comparison screen 800 in a case where A4 size has been selected as the size of the output destination sheet, that is, in a state where the sheet size selection button 808 corresponding to A4 size is colored as appropriate.

The sheet size selection button 806, 808, 810, or 812 corresponding to the optimal sheet size is colored as appropriate immediately (initially) after the preview comparison screen 800 is displayed due to the operation on the "select another sheet" button 712 on the above-described optimal sheet size presentation screen 700. For example, it is assumed that the "select another sheet" button 712 is operated on the optimal sheet size presentation screen 700 in the mode indicating that A4 size has been identified as the optimal sheet size as illustrated in FIG. 12. Accordingly, the preview comparison screen 800 is displayed in the mode illustrated in FIG. 13, i.e., in the mode where the sheet size selection button 808 corresponding to the optimal sheet size, A4 size, is colored as appropriate. Here, the corresponding ones out of the sheet size selection buttons 806, 808, 810, and 812 and the preview images 814, 816, 818, and 820 are regarded as a unit, i.e., a pair. In this perspective, it can be said that the one corresponding to the optimal sheet size among the preview images 814, 816, 818, and 820 is displayed in a mode different from the others, that is, in a distinguishable mode.

With the above-described preview comparison screen 800, especially the preview images 814, 816, 818, and 820, the user may intuitively recognize the results of the printed material in a case where the image of the document 100 is output to the respective sheets of the four sizes at the magnification of 100% while comparing the results with each other. The text indicating the copy fee per page and attached to each of the sheet size selection buttons 806, 808, 810, and 812 serves as a useful reference when the user selects the output destination sheet.

When any sheet size is selected as the size of the output destination sheet and the "OK" button 826 is operated on the preview comparison screen 800, the display 34*a* presents, instead of the preview comparison screen 800, the sheet selection screen 200 in the mode to which the selection content is applied. For example, when A4 size is selected as the sheet size that is the output destination as illustrated in FIG. 13 and the "OK" button 826 is operated, the sheet selection screen 200 is displayed in the mode illustrated in FIG. 7, that is, in the mode indicating that the A4 size sheet (regular sheet) has been selected as the output destination.

Figure 14:
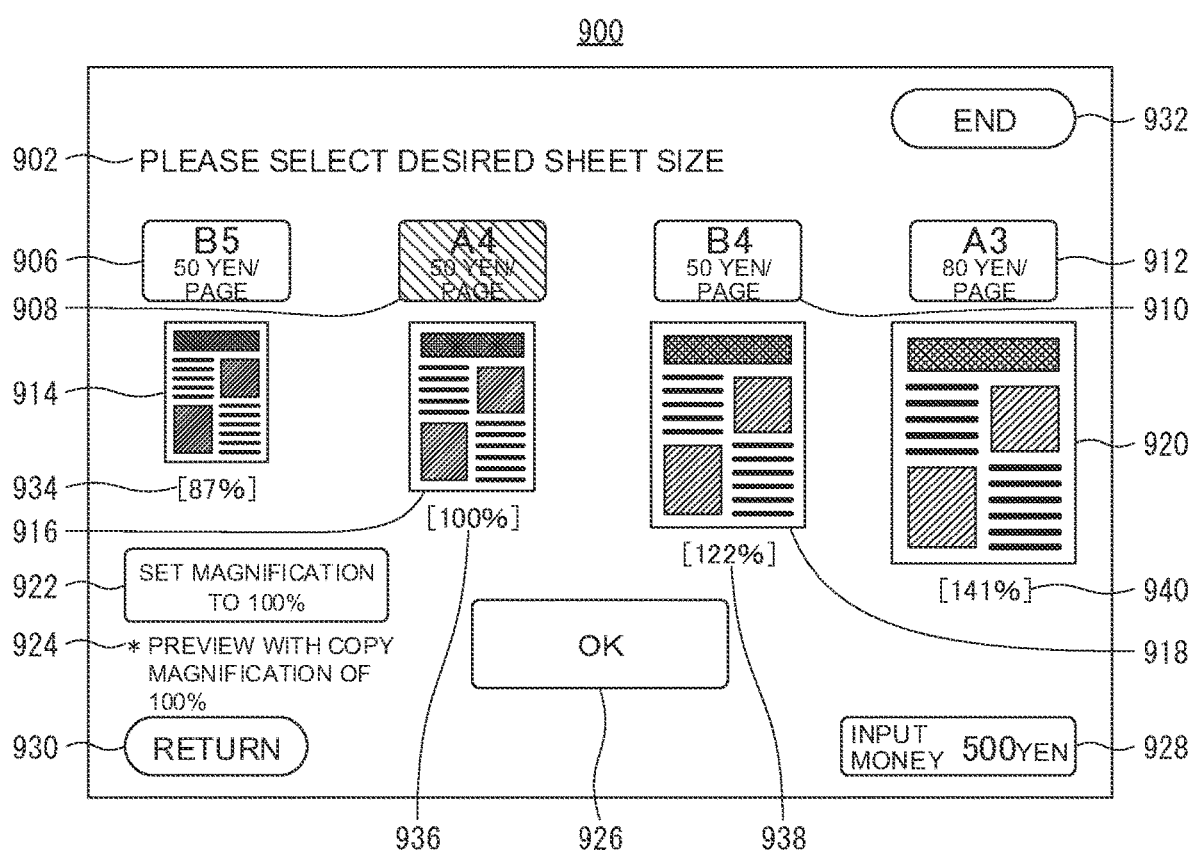
FIG. 14 is a diagram illustrating an example of a post-magnification adjustment comparison screen according to the second embodiment.

When the "fit to sheet" button 822 is operated on the preview comparison screen 800, the display 34*a* presents the post-magnification adjustment comparison screen 900 illustrated in FIG. 14 instead of the preview comparison screen 800. FIG. 14 is an example of the post-magnification adjustment comparison screen 900 displayed when the "fit to sheet" button 822 is operated on the preview comparison screen 800 in a state where A4 size has been selected as the sheet size that is the output destination as illustrated in FIG. 13.

As illustrated in FIG. 14, an appropriate text 902 having the content prompting the user to select the size of the output destination sheet is provided on, for example, the upper portion of the post-magnification adjustment comparison screen 900. Four sheet size selection buttons 906, 908, 910, and 912, which are similar to those on the preview comparison screen 800, are arranged side by side under the text 902. Preview images 914, 916, 918, and 920 in a case where the image of the document 100 is output to the corresponding sheet at the magnification corresponding to the sheet size, for example, at such a magnification that the image of the document 100 fits maximally to the sheet of the corresponding size are provided under the sheet size selection buttons 906, 908, 910, and 912. Appropriate texts 934, 936, 938, and 940 indicating the corresponding magnifications are provided under the preview images 914, 916, 918, and 920.

A "set magnification to 100%" button 922 is provided at an appropriate position on the post-magnification adjustment comparison screen 900, for example, under the preview image 914 corresponding to B5 size, strictly speaking, under the text 934. The "set magnification to 100%" button 922 is an operator to display a preview image in a case where the image of the document 100 is output to the sheet of each size at a magnification of 100% (one-fold) and, in other words, an operator to transition to the preview comparison screen 800 described above. An appropriate text 924 representing a brief description of the "set magnification to 100%" button 922 is provided under the "set magnification to 100%" button 922.

An "OK" button 926 is provided on the right side of the "set magnification to 100%" button 922 and the text 924 on the post-magnification adjustment comparison screen 900, in other words, at the center position of the lower portion of the post-magnification adjustment comparison screen 900. The "OK" button 926 is an operator to apply the sheet size selected on the post-magnification adjustment comparison screen 900 to the above-described sheet selection screen 200, in other words, an operator to transition to the sheet selection screen 200.

An input-money display area 928, a "return" button 930, and an "end" button 932 are also provided on the post-magnification adjustment comparison screen 900 as on the preview comparison screen 800. For example, the input-money display area 928 in FIG. 14 illustrates that the input money is "500 yen" at the present time. When the "return" button 930 is operated, the display 34*a* presents the above-described optimal sheet size presentation screen 700 instead of the post-magnification adjustment comparison screen 900. When the "end" button 932 is operated, the display 34*a* presents the end confirmation screen (not illustrated), which is the same as that described above, instead of the post-magnification adjustment comparison screen 900. When the "Yes" button is operated on the end confirmation screen, the display 34*a* presents the above-described home screen instead of the end confirmation screen. Conversely, when the "No" button is operated on the end confirmation screen, the display 34a presents the post-magnification adjustment comparison screen 900 again instead of the end confirmation screen.

When any of the sheet size selection buttons 906, 908, 910, and 912 is operated on the post-magnification adjustment comparison screen 900 in the same manner as on the preview comparison screen 800, the sheet size corresponding to the operated sheet size selection button 906, 908, 910, or 912 is selected as the size of the output destination sheet. The sheet size selection button 906, 908, 910, or 912 corresponding to the selected sheet size (that is, operated) is modified as appropriate, for example, is colored as appropriate. FIG. 14 illustrates an example of the post-magnification adjustment comparison screen 900 in a case where A4 size has been selected as the size of the output destination sheet, that is, in a state where the sheet size selection button 908 corresponding to A4 size is colored as appropriate.

The selection content of the sheet size on the preview comparison screen 800 is applied to the post-magnification adjustment comparison screen 900 immediately (initially) after the post-magnification adjustment comparison screen 900 is displayed due to the operation of the "fit to sheet" button 822 on the above-described preview comparison screen 800. For example, it is assumed that the "fit to sheet" button 822 is operated on the preview comparison screen 800 in a state where A4 size has been selected as the size of the output destination sheet as illustrated in FIG. 13. Accordingly, the post-magnification adjustment comparison screen 900 is displayed in the mode illustrated in FIG. 14, i.e., in the mode where the sheet size selection button 908 corresponding to A4 size is colored as appropriate.

With the above-described post-magnification adjustment comparison screen 900, especially the preview images 914, 916, 918, and 920, the user may intuitively recognize the results of the printed material in a case where the image of the document 100 is output to the respective sheets of the four sizes at the respective magnifications corresponding to the four sizes while comparing the results with each other. The text indicating the copy fee per page and attached to each of the sheet size selection buttons 906, 908, 910, and 912 serves as a useful reference when the user selects the output destination sheet. The magnifications indicated by the texts 934, 936, 938, and 940 provided under the preview images 914, 916, 918, and 920 also serve as a useful reference when the user selects the output destination sheet.

When any sheet size is selected as the size of the output destination sheet and the "OK" button 926 is operated on the post-magnification adjustment comparison screen 900, the display 34a presents, instead of the post-magnification adjustment comparison screen 900, the sheet selection screen 200 in the mode to which the selection content is applied. For example, when A4 size is selected as the size of the output destination sheet as illustrated in FIG. 14 and then the "OK" button 926 is operated, the sheet selection screen 200 is displayed in the mode illustrated in FIG. 7, that is, in the mode indicating that the A4 size sheet (regular sheet) has been selected as the output destination.

When the "set magnification to 100%" button 922 is operated on the post-magnification adjustment comparison screen 900, the display 34a presents the above-described preview comparison screen 800 instead of the post-magnification adjustment comparison screen 900. In this case, too, that is, in a case where the post-magnification adjustment comparison screen 900 transitions to the preview comparison screen 800, the selection content of the sheet size on the post-magnification adjustment comparison screen 900 is applied to the preview comparison screen 800. For example, it is assumed that the "set magnification to 100%" button 922 is operated on the post-magnification adjustment comparison screen 900 in a state where A4 size has been selected as the size of the output destination sheet as illustrated in FIG. 14. Accordingly, the preview comparison screen 800 is displayed in the mode illustrated in 13, that is, in the mode where the sheet size selection button 808 corresponding to A4 size is colored as appropriate. In other words, it can be said that the preview comparison screen 800 and the post-magnification adjustment comparison screen 900 are screens in which the preview images 814, 816, 818, and 820 and the preview images 914, 916, 918, and 920 have different magnifications.

According to the second embodiment described above, too, the CPU 20a executes the sheet size identification task in response to the operation of the "check sheet size" button 206 on the above-described sheet selection screen 200. In the sheet size identification task according to the second embodiment, Steps S101 to S159 are executed in the flow illustrated in FIGS. 15 to 17 instead of Step S27 (FIG. 11).

Figure 15:
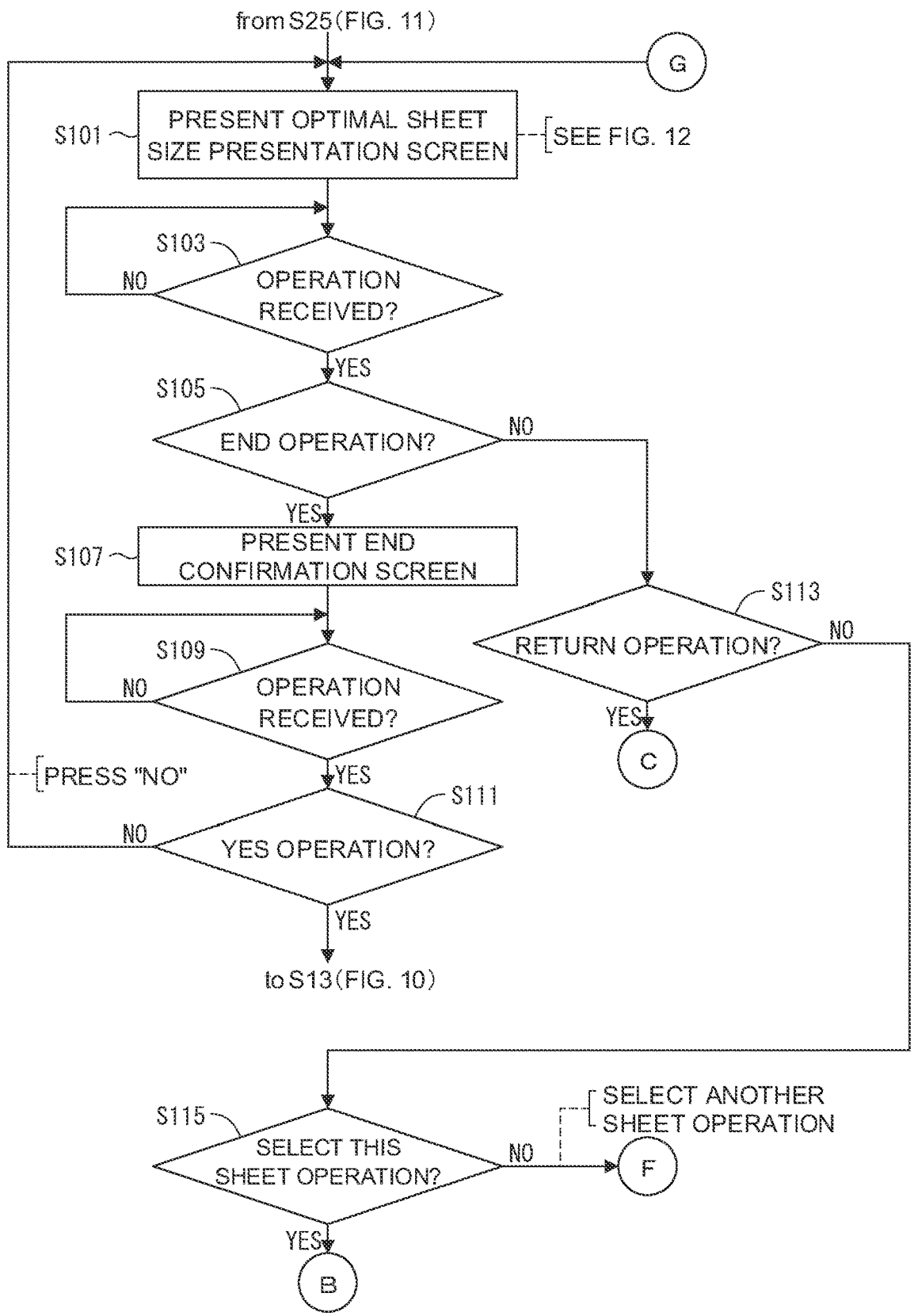
FIG. 15 is a flowchart illustrating the flow of part of a sheet size identification task according to the second embodiment.

Specifically, after the sheet corresponding to the optimal sheet size is selected as the output destination sheet at Step S25 (FIG. 11) described above, that is, after the data about the sheet is stored as the sheet selection data 656, the CPU 20a proceeds to the process at Step S101 (FIG. 15). At Step S101, the CPU 20a causes the display 34a to present the optimal sheet size presentation screen 700, strictly speaking, to present the optimal sheet size presentation screen 700 instead of the above-described pre-scan in-execution message screen. Then, the CPU 20a proceeds to the process at Step S103.

At Step S103, the CPU 20a waits until any user's operation is received through the optimal sheet size presentation screen 700 (S103: NO). When any operation is received through the optimal sheet size presentation screen 700 (S103: YES), the CPU 20a proceeds to the process at Step S105.

At Step S105, the CPU 20a determines whether the operation received at Step S103 is the operation of the "end" button 720 on the optimal sheet size presentation screen 700. For example, when the operation received at Step S103 is the operation of the "end" button 720 (S105: YES), the CPU 20a proceeds to the process at Step S107. Conversely, when the operation received at Step S103 is not the operation of the "end" button 720, that is, when the operation is an operation other than the operation of the "end" button 720 (S105: NO), the CPU 20a proceeds to the process at Step S113 described below.

At Step S107, the CPU 20a causes the display 34a to present the above-described end confirmation screen, strictly speaking, to present the end confirmation screen instead of the optimal sheet size presentation screen 700. Then, the CPU 20a proceeds to the process at Step S109.

At Step S109, the CPU 20a waits until any user's operation is received through the end confirmation screen (S109: NO). When any operation is received through the end confirmation screen, the CPU 20a proceeds to the process at Step S111.

At Step S111, the CPU 20a determines whether the operation received at Step S109 is the operation of the "Yes" button on the end confirmation screen. For example, when the operation received at Step S109 is the operation of the "Yes" button on the end confirmation screen (S111: YES), the CPU 20a proceeds to the process at Step S13 (FIG. 10). Accordingly, the display 34a presents the above-described home screen instead of the end confirmation screen. Conversely, when the operation received at Step S109 is not the operation of the "Yes" button, that is, the operation of the "No" button (S111: NO), the CPU 20a returns to the process at Step S101. Accordingly, the display 34a presents the optimal sheet size presentation screen 700 again instead of the end confirmation screen.

When the process proceeds from Step S105 described above to Step S113, the CPU 20a determines whether the operation received at Step S103 described above is the operation of the "return" button 718 on the optimal sheet size presentation screen 700 at Step S113. For example, when the operation received at Step S103 is the operation of the "return" button 718 (S113: YES), the CPU 20a returns to the process at Step S1. Accordingly, the display 34a presents the pre-scan guidance screen 300 instead of the optimal sheet size presentation screen 700. Conversely, when the operation received at Step S103 is not the operation of the "return" button 718 (S113: NO), the CPU 20a proceeds from the process at Step S113 to Step S115.

Figure 16:
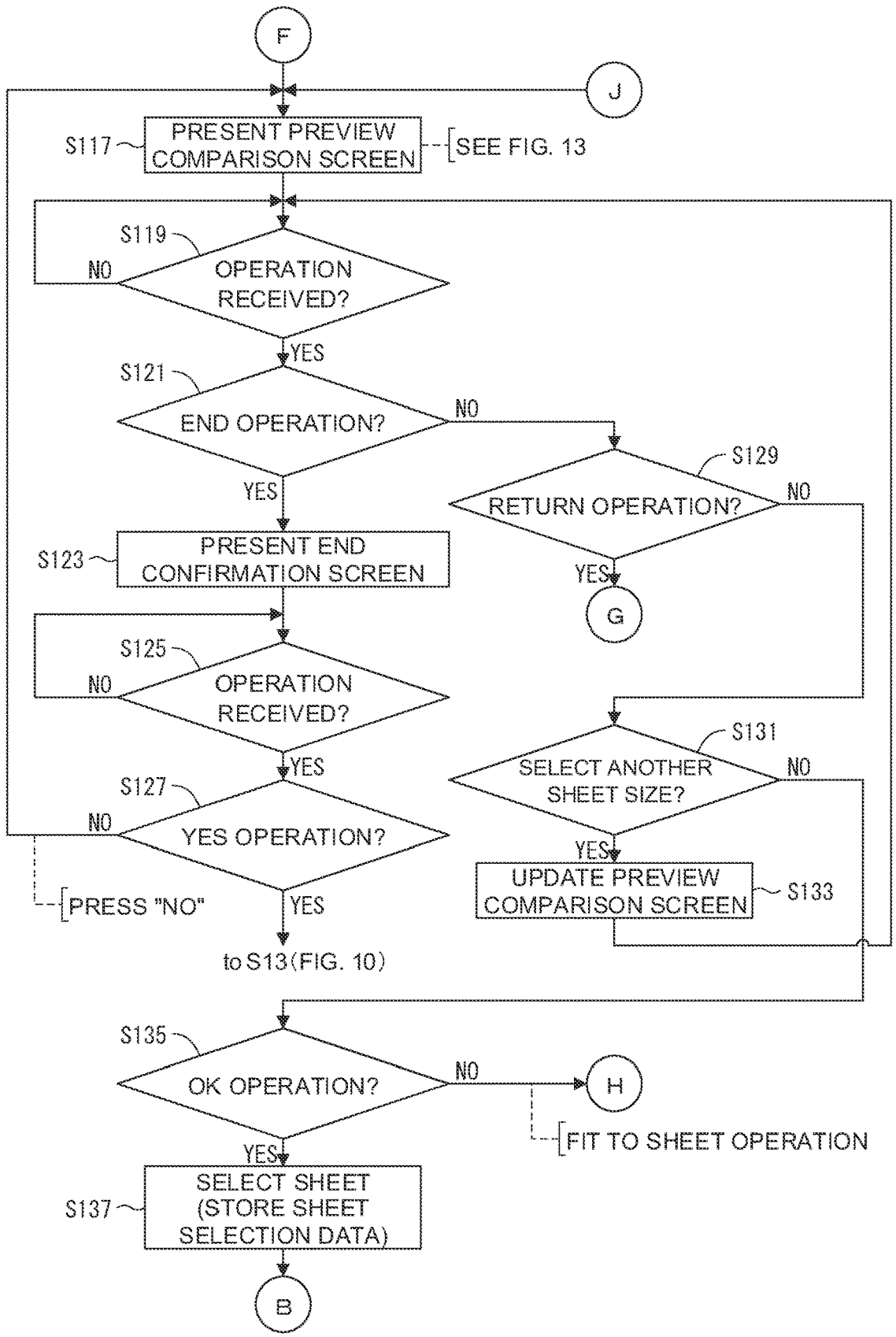
FIG. 16 is a flowchart illustrating the flow of another part of the sheet size identification task according to the second embodiment.
Figure 17:
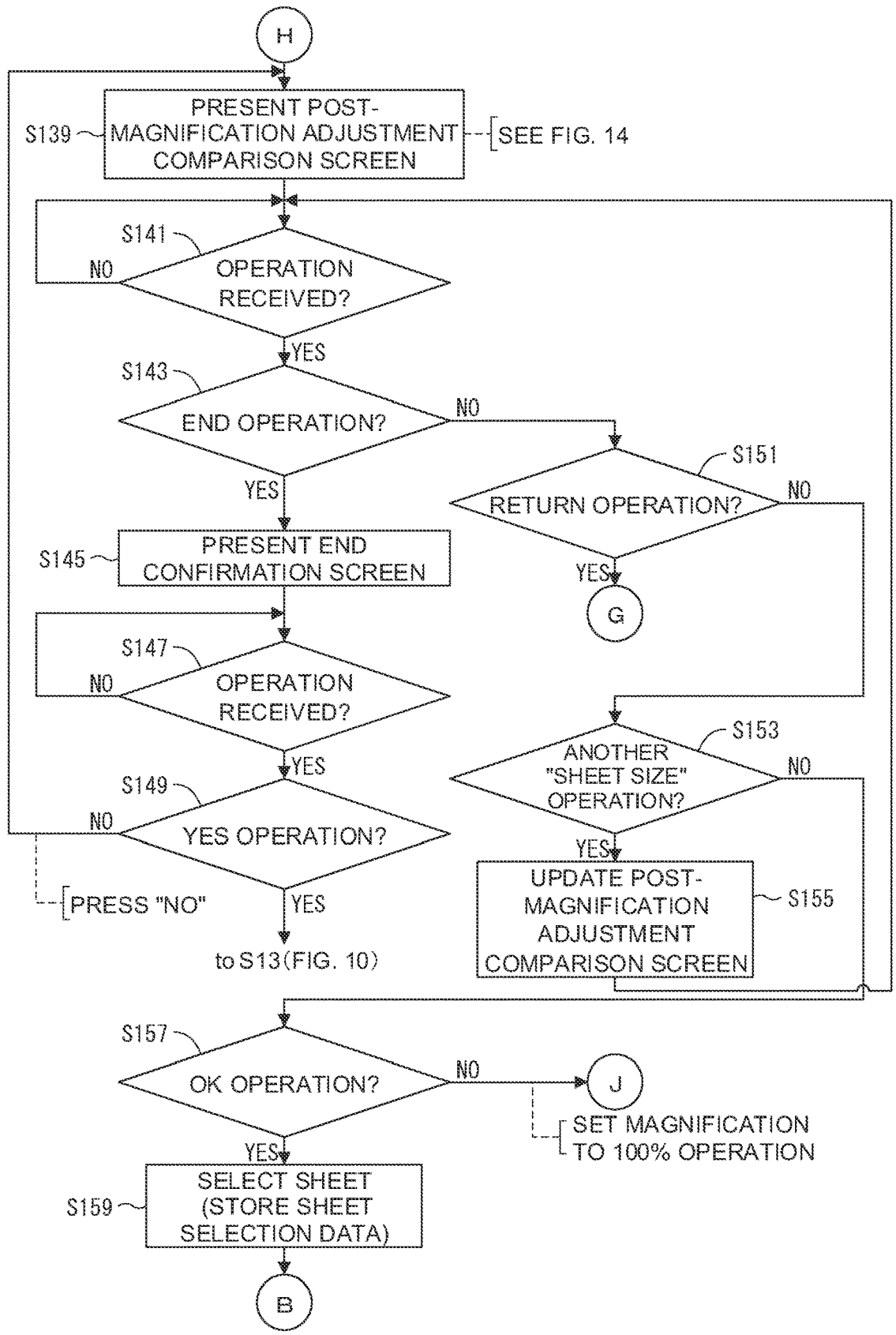
FIG. 17 is a flowchart illustrating the flow of the remaining part of the sheet size identification task according to the second embodiment.

At Step S115, the CPU 20a determines whether the operation received at Step S103 described above is the operation of the "select this sheet" button 714 on the optimal sheet size presentation screen 700. For example, when the operation received at Step S103 is the operation of the "select this sheet" button 714 (S115: YES), the CPU 20a proceeds to the process at Step S17. Accordingly, the display 34a presents the sheet selection screen 200 instead of the optimal sheet size presentation screen 700. Here, the sheet selection screen 200 is displayed in the mode corresponding to the sheet selection data 656 stored at Step S25 described above, that is, in the mode indicating that the sheet corresponding to the sheet selection data 656 has been selected as the output destination. Conversely, when the operation received at Step S103 is not the operation of the "select this sheet" button 714, that is, the operation of the "select another sheet" button 712 (S115: NO), the CPU 20a proceeds from the process at Step S115 to Step S117 (FIG. 16).

At Step S117, the CPU 20a causes the display 34a to present the preview comparison screen 800, strictly speaking, to present the preview comparison screen 800 instead of the optimal sheet size presentation screen 700. Then, the CPU 20a proceeds to the process at Step S119.

At Step S119, the CPU 20a waits until any user's operation is received through the preview comparison screen 800 (S119: NO). When any operation is received through the preview comparison screen 800 (S119: YES), the CPU 20a proceeds to the process at Step S121.

At Step S121, the CPU 20a determines whether the operation received at Step S119 is the operation of the "end" button 832 on the preview comparison screen 800. For example, when the operation received at Step S119 is the operation of the "end" button 832 (S121: YES), the CPU 20a proceeds to the process at Step S123. Conversely, when the operation received at Step S119 is not the operation of the "end" button 832, that is, an operation other than the operation of the "end" button 832 (S121: NO), the CPU 20a proceeds from the process at Step S121 to Step 129 described below.

At Step S123, the CPU 20a causes the display 34a to present the above-described end confirmation screen, strictly speaking, to present the end confirmation screen instead of the preview comparison screen 800. Then, the CPU 20a proceeds to the process at Step S125.

At Step S125, the CPU 20a waits until any user's operation is received through the end confirmation screen (S125: NO). When any operation is received through the end confirmation screen (S125: YES), the CPU 20a proceeds to the process at Step S127.

At Step S127, the CPU 20a determines whether the operation received at Step S125 is the operation of the "Yes" button on the end confirmation screen. For example, when the operation received at Step S125 is the operation of the "Yes" button on the end confirmation screen (S127: YES), the CPU 20a proceeds to the process at Step S13 (FIG. 10). Accordingly, the display 34a presents the above-described home screen instead of the end confirmation screen. Conversely, when the operation received at Step S125 is not the operation of the "Yes" button, that is, the operation of the "No" button (S127: NO), the CPU 20a returns to the process at Step S117. Accordingly, the display 34a presents the preview comparison screen 800 again instead of the end confirmation screen.

When the process proceeds from Step S121 described above to Step S129, the CPU 20a determines whether the operation received at Step S119 described above is the operation of the "return" button 830 on the preview comparison screen 800 at Step S129. For example, when the operation received at Step S119 is the operation of the "return" button 830 (S129: YES), the CPU 20a returns to the process at Step S101. Accordingly, the display 34a presents the optimal sheet size presentation screen 700 instead of the preview comparison screen 800. Conversely, when the operation received at Step S119 is not the operation of the "return" button 830 (S129: NO), the CPU 20a proceeds from the process at Step S129 to Step S131.

At Step S131, when the operation received at Step S119 described above is the operation to select another sheet size, that is, when any button other than the selected (appropriately colored) button among the sheet size selection buttons 806, 808, 810, and 812 is operated (S131: YES), the CPU 20a proceeds to the process at Step S133. Conversely, when the operation received at Step S119 is not the operation to select another sheet size, that is, when any button other than the selected button among the sheet size selection buttons 806, 808, 810, and 812 is not operated (S131: NO), the CPU 20a proceeds from the process at Step S131 to Step S135 described below.

At Step S133, the CPU 20a updates the preview comparison screen 800 so as to have the mode corresponding to the operation received at Step S119. Specifically, the preview comparison screen 800 is updated such that the button operated at Step S119 among the sheet size selection buttons 806, 808, 810, and 812 is selected (colored as appropriate). After Step S133 is executed, the CPU 20a returns to the process at Step S119.

When the process proceeds from Step S131 described above to Step S135, the CPU 20a determines whether the operation received at Step S119 described above is the operation of the "OK" button 826 on the preview comparison screen 800 at Step S135. For example, when the operation received at Step S119 is the operation of the "OK" button 826 (S135: YES), the CPU 20a proceeds to the process at Step S137. Conversely, when the operation received at Step S119 is not the operation of the "OK" button 826, that is, the operation of the "fit to sheet" button 822 (S135: NO), the CPU 20a proceeds from the process at Step S135 to Step S139 (FIG. 17) described below.

At Step S137, the CPU 20a selects the sheet size corresponding to the selected (appropriately colored) button among the sheet size selection buttons 806, 808, 810, and 812 as the size of the output destination sheet, that is, selects the output destination sheet. Specifically, the CPU 20a stores the data about the sheet selected as the output destination as the above-described sheet selection data 656. After Step S137 is executed, the CPU 20*a* proceeds to the process at Step S17. Accordingly, the display 34*a* presents the sheet selection screen 200 instead of the preview comparison screen 800. Here, the sheet selection screen 200 is displayed in the mode corresponding to the sheet selection data 656 stored at Step S137, that is, is displayed in the mode indicating that the sheet corresponding to the sheet selection data 656 has been selected as the output destination.

When the process proceeds from Step S135 described above to Step S139, the CPU 20*a* causes the display 34*a* to present the post-magnification adjustment comparison screen 900 at Step S139, strictly speaking, to present the post-magnification adjustment comparison screen 900 instead of the preview comparison screen 800. Then, the CPU 20*a* proceeds to the process at Step S141.

At Step S141, the CPU 20*a* waits until any user's operation is received through the post-magnification adjustment comparison screen 900 (S141: NO). When any operation is received through the post-magnification adjustment comparison screen 900 (S141: YES), the CPU 20*a* proceeds to the process at Step S143.

At Step S143, the CPU 20*a* determines whether the operation received at Step S141 is the operation of the "end" button 932 on the post-magnification adjustment comparison screen 900. For example, when the operation received at Step S141 is the operation of the "end" button 932 (S143: YES), the CPU 20*a* proceeds to the process at Step S145. Conversely, when the operation received at Step S141 is not the operation of the "end" button 932, that is, an operation other than the operation of the "end" button 932 (S143: NO), the CPU 20*a* proceeds to the process from Step S143 to Step S151 described below.

At Step S145, the CPU 20*a* causes the display 34*a* to present the above-described end confirmation screen, strictly speaking, to present the end confirmation screen instead of the post-magnification adjustment comparison screen 900. Then, the CPU 20*a* proceeds to the process at Step S147.

At Step S147, the CPU 20*a* waits until any user's operation is received through the end confirmation screen (S147: NO). When any operation is received through the end confirmation screen (S147: YES), the CPU 20*a* proceeds to the process at Step S149.

At Step S149, the CPU 20*a* determines whether the operation received at Step S147 is the operation of the "Yes" button on the end confirmation screen. For example, when the operation received at Step S147 is the operation of the "Yes" button on the end confirmation screen (S149: YES), the CPU 20*a* proceeds to the process at Step S13 (FIG. 10). Accordingly, the display 34*a* presents the above-described home screen instead of the end confirmation screen. Conversely, when the operation received at Step S147 is not the operation of the "Yes" button, that is, the operation of the "No" button (S149: NO), the CPU 20*a* returns the process to Step S139. Accordingly, the display 34*a* presents the post-magnification adjustment comparison screen 900 again instead of the end confirmation screen.

When the process proceeds from Step S143 described above to Step S151, the CPU 20*a* determines whether the operation received at Step S141 described above is the operation of the "return" button 930 on the post-magnification adjustment comparison screen 900 at Step S151. For example, when the operation received at Step S141 is the operation of the "return" button 930 (S151: YES), the CPU 20*a* returns to the process at Step S101. Accordingly, the display 34*a* presents the optimal sheet size presentation screen 700 instead of the post-magnification adjustment comparison screen 900. Conversely, when the operation received at Step S141 is not the operation of the "return" button 930 (S151: NO), the CPU 20*a* proceeds from the process at Step S151 to Step S153.

At Step S153, when the operation received at Step S141 described above is the operation to select another sheet size, that is, when any button other than the selected (appropriately colored) button among the sheet size selection buttons 906, 908, 910, and 912 is operated (S153: YES), the CPU 20*a* proceeds to the process at Step S155. Conversely, when the operation received at Step S141 is not the operation to select another sheet size, that is, when any button, other than the selected button, among the sheet size selection buttons 906, 908, 910, and 912, is not operated (S153: NO), the CPU 20*a* proceeds from the process at Step S153 to Step S157 described below.

At Step S155, the CPU 20*a* updates the post-magnification adjustment comparison screen 900 so as to have the mode corresponding to the operation received at Step S141. Specifically, the post-magnification adjustment comparison screen 900 is updated such that the button operated at Step S141 among the sheet size selection buttons 906, 908, 910, and 912 is selected (colored as appropriate). After Step S155 is executed, the CPU 20*a* returns to the process at Step S141.

When the process proceeds from Step S153 described above to Step S157, the CPU 20*a* determines whether the operation received at Step S141 described above is the operation of the "OK" button 926 on the post-magnification adjustment comparison screen 900 at Step S157. For example, when the operation received at Step S141 is the operation of the "OK" button 926 (S157: YES), the CPU 20*a* proceeds to the process at Step S159. Conversely, when the operation received at Step S141 is not the operation of the "OK" button 926, that is, the operation of the "set magnification to 100%" button 922 (S157: NO), the CPU 20*a* proceeds from the process at Step S157 to Step S117 (FIG. 16) described above.

At Step S159, the CPU 20*a* selects the sheet size corresponding to the selected (appropriately colored) button among the sheet size selection buttons 906, 908, 910, and 912 as the size of the output destination sheet, that is, selects the output destination sheet. Specifically, the CPU 20*a* stores the data about the sheet selected as the output destination as the above-described sheet selection data 656. After Step S159 is executed, the CPU 20*a* proceeds to the process at Step S17. Accordingly, the display 34*a* presents the sheet selection screen 200 instead of the post-magnification adjustment comparison screen 900. Here, the sheet selection screen 200 is displayed in the mode corresponding to the sheet selection data 656 stored at Step S159, that is, is displayed in the mode indicating that the sheet corresponding to the sheet selection data 656 has been selected as the output destination.

As described above, according to the second embodiment, with the optimal sheet size presentation screen 700, it is possible to recognize the optimal sheet size and to intuitively recognize the result of the printed material that is expected when the sheet of the optimal sheet size is the output destination. Furthermore, according to the second embodiment, with the preview comparison screen 800, it is possible to intuitively recognize the results of the printed material in a case where the image of the document 100 is output to the respective sheets of the four sizes, prepared in the multi-function peripheral 10, at the magnification of 100% while comparing the results with each other. Moreover, according to the second embodiment, with the post-magnification adjustment comparison screen 900, it is possible to intuitively recognize the results of the printed material in a case where the image of the document 100 is output to the respective sheets of the four sizes at the respective magnifications corresponding to the four sizes while comparing the results with each other. The preview comparison screen 800 and the post-magnification adjustment comparison screen 900 may be, so to speak, switched optionally. This greatly contributes to the further improvement in the usability of the multifunction peripheral 10.

The optimal sheet size presentation screen 700 according to the second embodiment is also an example of the second screen according to the present invention. The CPU 20a that causes the display of the optimal sheet size presentation screen 700, i.e., the CPU 20a that executes Step S101 (FIG. 15) in the sheet size identification task, is an example of the second display controller according to the present invention.

The preview comparison screen 800 according to the second embodiment is an example of a third screen according to the present invention. The CPU 20a that causes the display of the preview comparison screen 800, i.e., the CPU 20a that executes Step S117 in the sheet size identification task, is an example of a third display controller according to the present invention. The "fit to sheet" button 822 on the preview comparison screen 800 is an example of a third operation receiver according to the present invention. Similarly, the post-magnification adjustment comparison screen 900 according to the third embodiment is also an example of the third screen according to the present invention. The CPU 20a that causes the display of the post-magnification adjustment comparison screen 900, i.e., the CPU 20a that executes Step S117 in the sheet size identification task, is an example of the third display controller according to the present invention. The "set magnification to 100%" button 922 on the post-magnification adjustment comparison screen 900 is an example of the third operation receiver according to the present invention.

The texts indicating the copy fees and attached to the sheet size selection buttons 806, 808, 810, and 812 on the preview comparison screen 800 are examples of fee information according to the present invention, that is, examples of accompanying information. Similarly, the texts indicating the copy fees and attached to the sheet size selection buttons 906, 908, 910, and 912 on the post-magnification adjustment comparison screen 900 are also examples of the fee information according to the present invention. The texts 934, 936, 938, and 940 indicating the magnifications provided under the preview images 914, 916, 918, and 920 on the post-magnification adjustment comparison screen 900 are examples of magnification information according to the present invention, that is, examples of accompanying information.

The "OK" button 826 on the preview comparison screen 800, strictly speaking, the "OK" button 826 and the sheet size selection buttons 806, 808, 810, and 812 are an example of a fourth operation receiver according to the present invention. The CPU 20a that executes Step S137 (FIG. 16) in the sheet size identification task in response to the operation of the "OK" button 826 is an example of a second setter according to the present invention. Similarly, the "OK" button 926 on the post-magnification adjustment comparison screen 900, strictly speaking, the "OK" button 926 and the sheet size selection buttons 906, 908, 910, and 912 are also an example of the fourth operation receiver according to the present invention. The CPU 20a that executes Step S159 (FIG. 17) in the sheet size identification task in response to the operation of the "OK" button 926 is an example of the second setter according to the present invention.

According to the second embodiment, as in the first embodiment, the selection content may be optionally changed after a certain sheet is selected as the output destination. The output destination sheet is changed on the sheet selection screen 200, specifically, by the operation of each of the sheet selection buttons 210, 212, 214, 216, and 218 provided on the sheet selection screen 200. Each of the sheet selection buttons 210, 212, 214, 216, and 218 receiving such an operation is an example of a fifth operation receiver according to the present invention. The output destination sheet is changed in accordance with the operation of each of the sheet selection buttons 210, 212, 214, 216, and 218, specifically, the data about the sheet is stored as the sheet selection data 656 in the main storage 20b. The CPU 20a causes the storage of the sheet selection data 656 in the main storage 20b, and the CPU 20a causing the storage of the sheet selection data 656 is an example of a second size changer according to the present invention.

Other Application Examples

Each of the above embodiments is a specific example of the present invention and does not limit the technical scope of the present invention. The present invention is also applicable to aspects other than the above embodiments.

For example, the configuration (design) of each screen, such as the sheet selection screen 200 illustrated in FIG. 2 and the pre-scan guidance screen 300 illustrated in FIG. 3, is not limited to the configuration described here. In particular, the "check sheet size" button 206 on the sheet selection screen 200, that is, the operator serving as the first operation receiver may be a hardware switch instead of a software switch that is the "check sheet size" button 206. On the sheet selection screen 200, the schematic diagram 204 may also function as an operator to select the output destination sheet. Specifically, a configuration may be such that the portion corresponding to each sheet in the schematic diagram 204 is operated as appropriate so as to select the output destination sheet as appropriate.

According to the first embodiment, for example, when the optimal sheet size presentation screen 400 is presented, the sound indicating the optimal sheet size may be output in addition to or instead of the optimal sheet size presentation screen 400. That is, the information indicating the optimal sheet size may be presented in the auditory mode that is the output of sound as well as in the visual mode that is the presentation of the optimal sheet size presentation screen 400.

Similarly, according to the second embodiment, when the optimal sheet size presentation screen 700 is presented, the sound indicating the optimal sheet size may be output in addition to or instead of the optimal sheet size presentation screen 700. The presentation of the optimal sheet size presentation screen 700 may be omitted. That is, a configuration may be such that, after the optimal sheet size is identified, the preview comparison screen 800 or the post-magnification adjustment comparison screen 900 is presented instead of the presentation of the optimal sheet size presentation screen 700.

Although the present invention is applied to the copy function of the multifunction peripheral 10 in the case described according to each of the embodiments, the present invention is not limited thereto. The present invention is applicable to the fax (transmission) function and the image scanner function of the multifunction peripheral 10. In other words, the present invention is applicable to not only the multifunction peripheral 10 that is an apparatus having multiple functions but also a copier that is an apparatus dedicated to copying, a fax apparatus that is an apparatus dedicated to fax, and an image scanner apparatus that is an apparatus dedicated to image scanning. That is, the present invention is applicable to not only an image forming apparatus that forms the image of the document 100 on a physical image recording medium such as a sheet, but also an image output apparatus that outputs the image of the document 100 as electronic information, that is, to an image output apparatus other than an image forming apparatus.

The present invention may be provided in not only the form of an apparatus such as an image output apparatus, but also in the form of a program (software) such as a control program for the image output apparatus and in the form of a method such as a method for controlling the image output apparatus.

The present invention may be also provided in the form of a computer-readable recording medium storing a control program for an image output apparatus. In this case, a computer of the image output apparatus reads and executes the control program stored in the recording medium so as to implement the image output apparatus similar to that of the present invention. Examples of the recording medium described here include a disk medium such as a CD, a DVD, or a flexible disk. A semiconductor medium such as a USB memory or an SD memory card is also applicable as the recording medium described here. Not only a portable medium but also a built-in (internal) medium such as a ROM or a hard disk drive that is built in an image output apparatus (computer system) is also applicable as the recording medium described here.

DESCRIPTION OF REFERENCE NUMERALS

- 10 . . . Multifunction peripheral
- 11 . . . Image reader
- 16 . . . Image former
- 20 . . . Controller
- 20a . . . CPU
- 20b . . . Main storage
- 34 . . . Operation display
- 34a . . . Display
- 34b . . . Touch panel
- 200 . . . Sheet selection screen
- 400 . . . Optimal sheet size presentation screen
- 700 . . . Optimal sheet size presentation screen with a preview
- 800 . . . Preview comparison screen
- 900 . . . Post-magnification adjustment comparison screen

What is claimed is:

1. An image output apparatus, comprising:
   a first operation receiver that receives, from a user, a first operation for giving an instruction to identify, as a size of a sheet that is an output destination of an image of a document, a suitable size corresponding to a size of the document;
   an image reader that reads the image of the document in response to the first operation received by the first operation receiver;
   a document size identifier that identifies the size of the document based on an image read by the image reader;
   a suitable size identifier that identifies the suitable size from multiple specified sizes based on the size of the document identified by the document size identifier;
   a display including a display surface; and
   a first display controller that causes the display surface to present a first screen including multiple preview images that are expected when the image of the document is output to the respective sheets of the specified sizes at a predetermined magnification.

2. The image output apparatus according to claim 1, further comprising:
   a second display controller that causes the display surface to present a second screen including an operator serving as the first operation receiver.

3. The image output apparatus according to claim 2, further comprising a third display controller that causes the display surface to present a third screen including suitable size information about the suitable size identified by the suitable size identifier.

4. The image output apparatus according to claim 1, further comprising a first setter that sets the suitable size identified by the suitable size identifier as the size of the sheet that is the output destination of the image of the document.

5. The image output apparatus according to claim 4, further comprising:
   a second operation receiver that receives, from the user, a second operation for giving an instruction to change the size of the sheet set by the first setter; and
   a first size changer that changes the size of the sheet set by the first setter in response to the second operation received by the second operation receiver.

6. The image output apparatus according to claim 1, wherein the predetermined magnification is a magnification common to the specified sizes.

7. The image output apparatus according to claim 1, wherein the predetermined magnification is a magnification corresponding to each of the specified sizes.

8. The image output apparatus according to claim 1, further comprising:
   a third operation receiver that receives, from the user, a third operation for giving an instruction to change the predetermined magnification; and
   a magnification changer that changes the predetermined magnification in response to the third operation received by the third operation receiver.

9. The image output apparatus according to claim 1, wherein among the preview images, the preview image corresponding to the suitable size is displayed in such a manner that the preview image is distinguishable from the other preview images.

10. The image output apparatus according to claim 1, wherein the first screen includes accompanying information corresponding to each of the preview images.

11. The image output apparatus according to claim 10, wherein
    a fee required to output the image of the document to the respective sheets of the specified sizes is previously determined, and
    the accompanying information includes fee information about the fee corresponding to each of the preview images.

12. The image output apparatus according to claim 10, wherein the accompanying information includes magnification information about the predetermined magnification corresponding to each of the preview images.

13. The image output apparatus according to claim 1, further comprising:
    a fourth operation receiver that receives, from the user, a fourth operation for giving an instruction to set any of the specified sizes corresponding to the preview images as the size of the sheet that is the output destination of the image of the document; and a second setter that sets the specified size corresponding to the fourth operation as the size of the sheet that is the output destination of the image of the document in response to the fourth operation received by the fourth operation receiver.

14. The image output apparatus according to claim 13, further comprising:

a fifth operation receiver that receives, from the user, a fifth operation for giving an instruction to change the size of the sheet set by the second setter; and a second size changer that changes the size of the sheet set by the second setter in response to the fifth operation received by the fifth operation receiver.

15. The image output apparatus according to claim 1, further comprising an image former that forms the image of the document on the sheet that is the output destination of the image of the document.

16. A non-transitory computer-readable recording medium having stored therein a control program for an image output apparatus including a first operation receiver that receives, from a user, a first operation for giving an instruction to identify, as a size of a sheet that is an output destination of an image of a document, a suitable size corresponding to a size of the document, and a display including a display surface, the control program causing a computer of the image output apparatus to execute a process comprising:

reading the image of the document in response to the first operation received by the first operation receiver;

first identifying the size of the document based on an image read at the reading;

second identifying the suitable size from multiple specified sizes based on the size of the document identified at the first identifying; and causing the display surface to present a first screen including multiple preview images that are expected when the image of the document is output to the respective sheets of the specified sizes at a predetermined magnification.

17. A method for controlling an image output apparatus including a first operation receiver that receives, from a user, a first operation for giving an instruction to identify, as a size of a sheet that is an output destination of an image of a document, a suitable size corresponding to a size of the document, and a display including a display surface, the method comprising:

reading the image of the document in response to the first operation received by the first operation receiver;

first identifying the size of the document based on an image read at the reading;

second identifying the suitable size from multiple specified sizes based on the size of the document identified at the first identifying;

causing the display surface to present a first screen including multiple preview images that are expected when the image of the document is output to the respective sheets of the specified sizes at a predetermined magnification.

* * * * *